US012501354B2

(12) United States Patent
Balmakhtar et al.

(10) Patent No.: US 12,501,354 B2
(45) Date of Patent: Dec. 16, 2025

(54) DATA COMMUNICATIONS OVER A WIRELESS COMMUNICATION NETWORK SLICE

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US); Robert Keith Butler, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 382 days.

(21) Appl. No.: 18/328,045

(22) Filed: Jun. 2, 2023

(65) Prior Publication Data

US 2024/0406853 A1 Dec. 5, 2024

(51) Int. Cl.
*H04W 48/18* (2009.01)
*H04W 28/02* (2009.01)

(52) U.S. Cl.
CPC ....... *H04W 48/18* (2013.01); *H04W 28/0268* (2013.01)

(58) Field of Classification Search
CPC . H04W 48/18; H04W 28/0268; H04W 12/08; H04W 84/12; H04W 92/02; H04W 76/12; H04W 12/06

(Continued)

(56) References Cited

U.S. PATENT DOCUMENTS 9,514,424 B2 12/2016 Kleinbart et al.
9,912,531 B2 3/2018 Neff et al.
(Continued)

FOREIGN PATENT DOCUMENTS

EP 2592808 A1 5/2013
WO 2021083553 A1 5/2021
(Continued)

OTHER PUBLICATIONS

"Untrusted Non-3GPP Access Network Interworking with 5G Core, Using Non 3-GPP Interworking Function (N3IFW)"; Wipro; Jun. 2020; 21 pages; https://www.wipro.com/network-edge-providers/untrusted-non-3gpp-access-network-interworking-with-5g-core/.
(Continued)

*Primary Examiner* — Huy C Ho

(57) ABSTRACT

A data communication system serves a wireless communication device over a Non Third Generation Partnership Project (non-3GPP) network slice. The data communication system receives a request for the non-3GPP slice from the wireless communication device over a non-3GPP access node. The data communication system exchanges network signaling with a 3GPP network. The data communication system receives an authorization from the 3GPP network for the wireless communication device to use the non-3GPP network slice. The data communication system establishes a Virtual Private Network (VPN) for the wireless communication device over the non-3GPP access node in response to the authorization from the 3GPP network. The data communication system exchanges user data with the wireless communication device over the VPN. The data communication system exchanges the user data with a non-3GPP communication system over the VPN or another VPN for the non-3GPP communication system.

20 Claims, 17 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,438,692 | B2 | 10/2019 | Neff | |
| 10,652,098 | B2 | 5/2020 | Kim | |
| 10,791,508 | B2 | 9/2020 | Park et al. | |
| 2002/0010866 | A1 | 1/2002 | McCullough et al. | |
| 2005/0195780 | A1 | 9/2005 | Haverinen et al. | |
| 2016/0328577 | A1 | 11/2016 | Howley | |
| 2019/0268973 | A1 | 8/2019 | Bull et al. | |
| 2019/0319858 | A1 | 10/2019 | Das et al. | |
| 2020/0067831 | A1 | 2/2020 | Spraggins et al. | |
| 2021/0377858 | A1 | 12/2021 | Huang et al. | |
| 2022/0095319 | A1 | 3/2022 | Duan et al. | |
| 2022/0141571 | A1* | 5/2022 | Kara | A61F 11/14 381/72 |
| 2022/0225223 | A1 | 7/2022 | Huang et al. | |
| 2022/0255996 | A1 | 8/2022 | Huang et al. | |
| 2022/0272572 | A1* | 8/2022 | Malhotra | H04W 48/18 |
| 2022/0337995 | A1 | 10/2022 | Baek et al. | |
| 2022/0345882 | A1 | 10/2022 | Balmakhtar et al. | |
| 2022/0405153 | A1 | 12/2022 | Xu | |
| 2023/0094027 | A1 | 3/2023 | Krishan | |
| 2023/0156650 | A1 | 5/2023 | Salkintzis et al. | |
| 2023/0180118 | A1* | 6/2023 | Gupta | H04W 48/18 455/422.1 |
| 2024/0333623 | A1 | 10/2024 | Chou et al. | |

FOREIGN PATENT DOCUMENTS

| | | | |
|---|---|---|---|
| WO | 2021202891 | A1 | 10/2021 |
| WO | 2022204042 | A1 | 9/2022 |
| WO | 2023161242 | A1 | 8/2023 |

OTHER PUBLICATIONS

"3rd Generation Partnership Project; Technical Specification Group Services and System Aspects; Security architecture and procedures for 5G system (Release 18)"; 3GPP; Mar. 2023; pp. 1-293; 3GPP TS 33.501 V18.1.0; 3GPP; Sophia Antipolis, France.

* cited by examiner

400

DATA COMMUNICATIONS OVER A WIRELESS COMMUNICATION NETWORK SLICE

TECHNICAL BACKGROUND

Wireless communication networks provide wireless data services to wireless communication devices like phones, computers, and other devices. The wireless data services may include internet-access, messaging, conferencing, or some other functionality. A common type of wireless communication network is a Third Generation Partnership Project (3GPP) network that is specified by numerous 3GPP standards. Many of the largest wireless communication networks in the world are 3GPP networks. The 3GPP networks comprise network elements like NodeBs, Access and Mobility Management Functions (AMFs), and User-Plane Functions (UPFs). In 3GPP networks, the wireless communication devices are referred to as User Equipment (UEs). The UEs wirelessly communicate with the NodeBs that communicate with the UPFs under the control of the AMFs. Thus, the UEs may access the internet, messaging servers, conferencing platforms, and other data systems over the Node Bs and UPFs under the control of the AMFs and other network elements.

The 3GPP networks also serve the UEs over non-3GPP systems like Wireless Fidelity (WIFI) access nodes that are coupled to Internet Protocol (IP) networks. The 3GPP networks comprise Non-3GPP Interworking Functions (N3IWFs) that serve as an interface between non-3GPP communication systems and 3GPP communication networks. Thus, the UEs may access the messaging servers, conferencing platforms, and other data systems over the non-3GPP communication systems and the N3IWFs.

The N3IWFs implement IPsec tunnels or some other data security technology to communicate with the UEs over the non-3GPP systems. In the 3GPP networks, the N3IWFs exchange network signaling with the AMFs over 3GPP N2 links and exchange user data with the UPFs over 3GPP N3 links. The N3IWFs also support 3GPP N1 signaling between the UEs and the AMFs over the N2 links and the IPsec tunnels. The N3IWFs enforce QoS and network policies over the 3GPP N3 links that carry the user data.

Wireless network slices comprise specialized network elements that are customized for specific types of data communications. For example, an internet-access slice may feature a highly-secure UPF that is customized to serve as an internet gateway, while a video-conferencing slice may feature a low-latency UPF that is customized to serve high-speed access to a video server. The UEs request and use the different network slices based on the current user need at the time. The N3IWFs provide access to the wireless network slices over the non-3GPP systems. For example, a UE may use a video-conference slice over a WIFI access node, IP network, N3IWF, and UPF.

Unfortunately, the N3IWFs do not effectively support wireless network slices that exist outside of the 3GPP network-non-3GPP slices. Moreover, the N3IWFs are not efficiently deployed outside of the 3GPP networks to properly support the non-3GPP slices.

TECHNICAL OVERVIEW

In some examples, a wireless communication device is served over a Non-Third Generation Partnership Project (non-3GPP) network slice. A request for the non-3GPP slice is received from the wireless communication device over a non-3GPP access node. In response to the request, network signaling is exchanged with a 3GPP network and an authorization is received from the 3GPP network for the wireless communication device to use the non-3GPP network slice. A Virtual Private Network (VPN) is established for the wireless communication device over the non-3GPP access node in response to the authorization from the 3GPP network. User data is exchanged with the wireless communication device over the VPN. The user data is exchanged with a non-3GPP communication system over one of the VPN and another VPN for the non-3GPP data communication system.

In some examples, one or more non-transitory machine-readable media comprises instructions to direct one or more microprocessors to operate a Non-Third Generation Partnership Project Interworking Function (N3IWF) to serve a wireless communication device over a non-3GPP network slice. The one or more microprocessors establish an enterprise VPN with an enterprise in response to an instruction from the 3GPP network. The one or more microprocessors receive a request for the non-3GPP network slice from a wireless communication device over a non-3GPP access node. In response to the request, the one or more microprocessors exchange network signaling with a 3GPP network and receive an authorization from the 3GPP network for the wireless communication device to use the non-3GPP network slice. The one or more microprocessors establish a user VPN with the wireless communication device over the non-3GPP access node in response to the authorization from the 3GPP network. The one or more microprocessors exchange user data with the wireless communication device over the user VPN. The one or more microprocessors exchange the user data with the enterprise over the enterprise VPN.

In some examples, an N3IWF serves a wireless communication device over a non-3GPP network slice. The N3IWF comprises an N3IWF VPN interface and an N3IWF N2 interface. The N3IWF VPN interface establishes an enterprise VPN with an enterprise. The N3IWF N2 interface exchanges network signaling with a 3GPP network and receives an authorization from the 3GPP network for the wireless communication device to use the non-3GPP network slice. The N3IWF VPN interface establishes a user VPN with the wireless communication device over the non-3GPP access node in response to the authorization from the 3GPP network. The N3IWF VPN interface exchanges user data with the wireless communication device over the user VPN. The N3IWF VPN interface exchanges the user data with the enterprise over the enterprise VPN.

DETAILED DESCRIPTION

Figure 1:
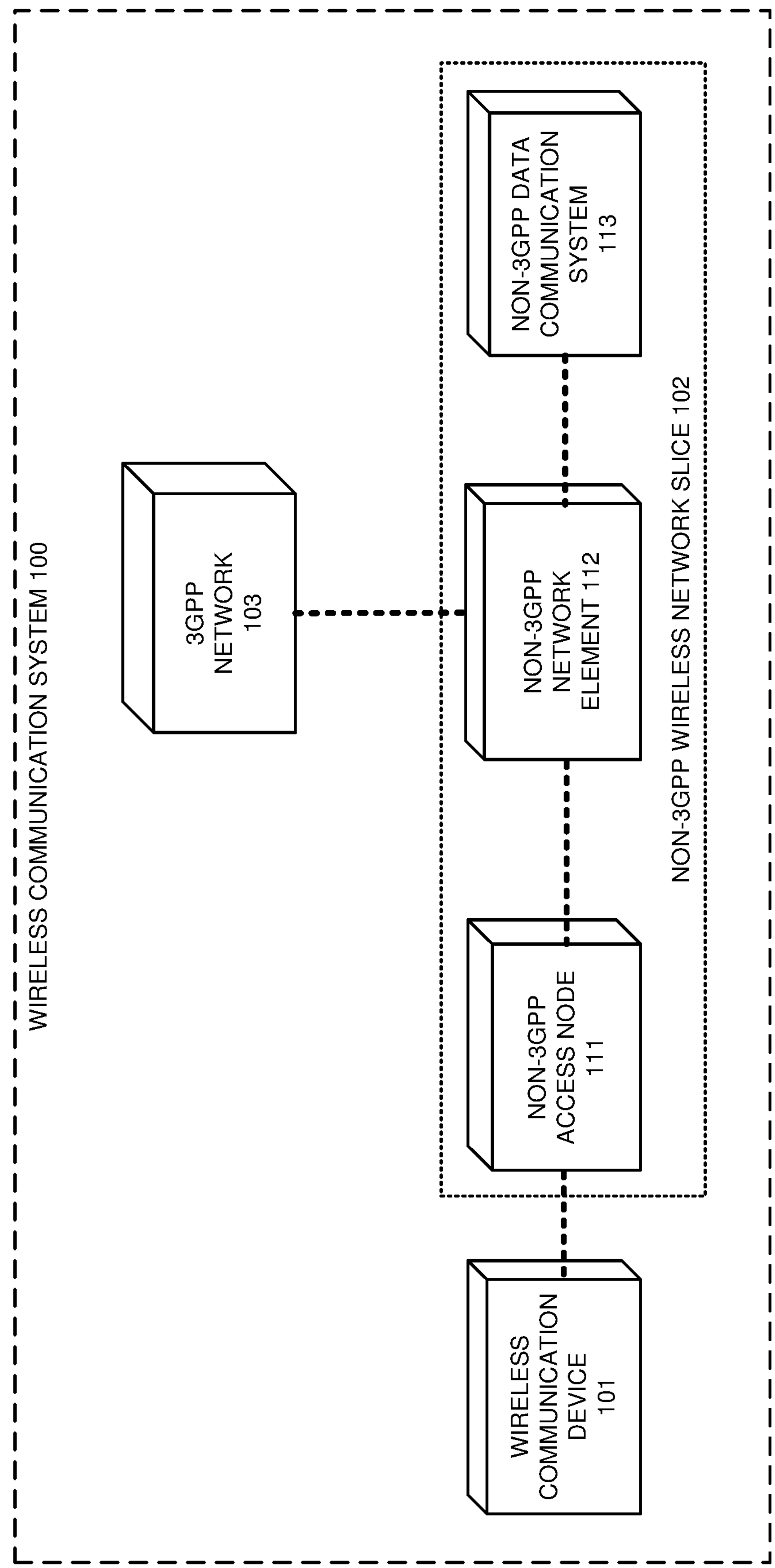
FIG. 1 illustrates an exemplary wireless communication system to serve a wireless communication device over a Non-Third Generation Partnership Project (non-3GPP) network slice.

FIG. 1 illustrates exemplary wireless communication system 100 to serve wireless communication device 101 over Non-Third Generation Partnership Project (non-3GPP) network slice 102. Wireless communication system 100 comprises wireless communication device 101, non-3GPP network slice 102, and 3GPP network 103. Non-3GPP network slice 102 comprises non-3GPP access node 111, non-3GPP network element 112, and non-3GPP data communication system 113. Non-3GPP network slice 102 uses non-3GPP access node 111 and non-3GPP data communication system 113 which are not specified by 3GPP standards. Non-3GPP network element 112 may be at least partially specified by 3GPP standards. The amount of wireless communication devices, wireless network slices, and 3GPP networks that are shown on FIG. 1 has been restricted for clarity.

Wireless communication device 101 comprises a phone, computer, vehicle, sensor, or some other user apparatus with wireless communication circuitry. 3GPP network 103 comprises node-Bs, Access and Mobility Management Functions (AMFs), User Plane Functions (UPFs), and other 3GPP network elements that are specified by 3GPP standards. Non-3GPP access node 111 comprises a Local Area Network (LAN) hot spot, Personal Area Network (PAN) transceiver, Internet-of-Things (IoT) gateway, or some other wireless communication node that is not a 3GPP wireless access node as specified by 3GPP standards. Non-3GPP network element 112 comprises an Interworking Function (IWF), Evolved Packet Data Gateway (EPDG), or some other data communication system that interfaces between 3GPP network elements and non-3GPP network elements. Non-3GPP data communication system 113 comprises network servers, communication computers, and/or some other type of non-3GPP data systems that are deployed at residencies, businesses, agencies, schools, hospitals, and the like.

Various examples of system operation and configuration are described herein. In some examples, wireless communication device 101 transfers request for non-3GPP network slice 102 to non-3GPP network element 112 over non-3GPP access node 111. In response to the slice request, non-3GPP network element 112 exchanges 3GPP signaling with 3GPP network 103. The exchange of the 3GPP signaling includes authentication information for wireless communication device 101. The exchange of the 3GPP signaling also includes an authorization from 3GPP network 103 for wireless communication device 101 to use non-3GPP network slice 102. In response to the authorization, non-3GPP network element 112 establishes a user Virtual Private Network (VPN) with wireless communication device 101 over non-3GPP access node 111. Non-3GPP network element 112 may already have a VPN established with non-3GPP data communication system 113. Alternatively in response to the authorization, non-3GPP network element 112 may extend the VPN with wireless communication device 101 to non-3GPP data communication system 113 or establish another VPN with non-3GPP data communication system 113. Non-3GPP network element 112 exchanges user data with wireless communication device 101 over the VPN which traverses non-3GPP access node 111. Non-3GPP network element 112 exchanges the user data with non-3GPP data communication system 113 over one of the VPNs noted above.

In some examples, non-3GPP network element 112 exchanges the network signaling with an Access and Mobility Management Function (AMF), Authentication Server Function (AUSF), User Data Management (UDM), Network Slice Selection Function (NSSF), Policy Control Function (PCF), and/or some other network functions in 3GPP network 103. Non-3GPP network element 112 may exchange 3GPP Non-Access Stratum (NAS) N1 signaling between wireless communication device 101 and 3GPP network 103 over non-3GPP access node 111. Non-3GPP network element 112 may exchange 3GPP N2 signaling with 3GPP network 103—typically with an AMF. In some examples, non-3GPP network element 112 implements a Quality-of-Service (QoS) level and/or a network policy for wireless communication device 101 in response to the exchange of the network signaling with 3GPP network 103.

Wireless communication device 101 comprises one or more radios that wirelessly communicate using wireless protocols like WIFI (Institute of Electrical and Electronics Engineers 802.11), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and Sixth Generation (6G) satellite communications. Non-3GPP access node 111 comprises one or more radios that wirelessly communicate using wireless protocols like WIFI, NFC, CDMA, FDMA, TDMA, and 6G satellite communications.

Wireless communication device 101, 3GPP network 103, non-3GPP access node 111, non-3GPP network element 112, and non-3GPP data communication system 113 comprise microprocessors, software, memories, transceivers, bus circuitry, and/or some other data processing components, The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, utilities, protocols, applications, and functions. The microprocessors retrieve the software from the memories and execute the software to drive the operation of wireless communication system 100 as described herein. Thus, wireless communication device 101, 3GPP network 103, non-3GPP access node 111, non-3GPP network element 112, and non-3GPP data communication system 113 comprise data processing circuitry and non-transitory machine-readable storage media that stores processing instructions that direct the data processing circuitry to perform the methods described herein.

Figure 2:
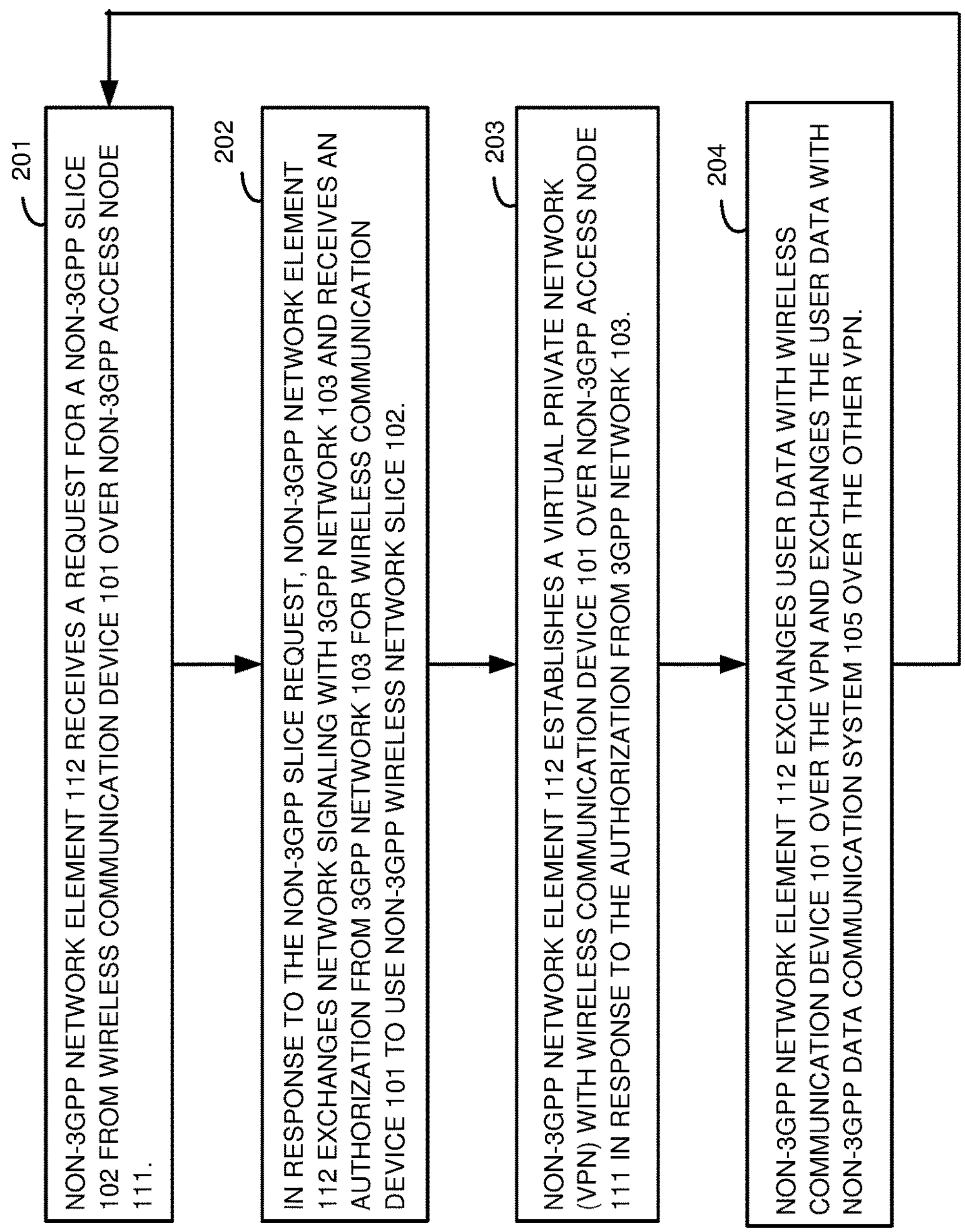
FIG. 2 illustrates an exemplary operation of the wireless communication system to serve the wireless communication device over the non-3GPP network slice.

FIG. 2 illustrates an exemplary operation of wireless communication system 100 to serve wireless communication device 101 over non-3GPP network slice 102. The operation may vary in other examples. Non-3GPP network element 112 receives a request for non-3GPP network slice 102 from wireless communication device 101 over non-3GPP access node 111 (201). In response to the slice request, non-3GPP network element 112 exchanges network signaling with 3GPP network 103 and receives an authorization from 3GPP network 103 for wireless communication device 101 to use non-3GPP network slice 102 (202). In response to the authorization, non-3GPP network element 112 establishes a user VPN with wireless communication device 101 over non-3GPP access node 111 (203). In this example, non-3GPP network element 112 already has another VPN established with non-3GPP data communication system 113, but alternatively, non-3GPP network element 112 may extend the VPN with wireless communication device 101 to non-3GPP data communication system 113 in response to the authorization or establish another VPN to non-3GPP data communication system 113 in response to the authorization. Non-3GPP network element 112 exchanges user data with wireless communication device 101 over the VPN and exchanges the user data with non-3GPP data communication system 113 over the other VPN (204).

Figure 3:
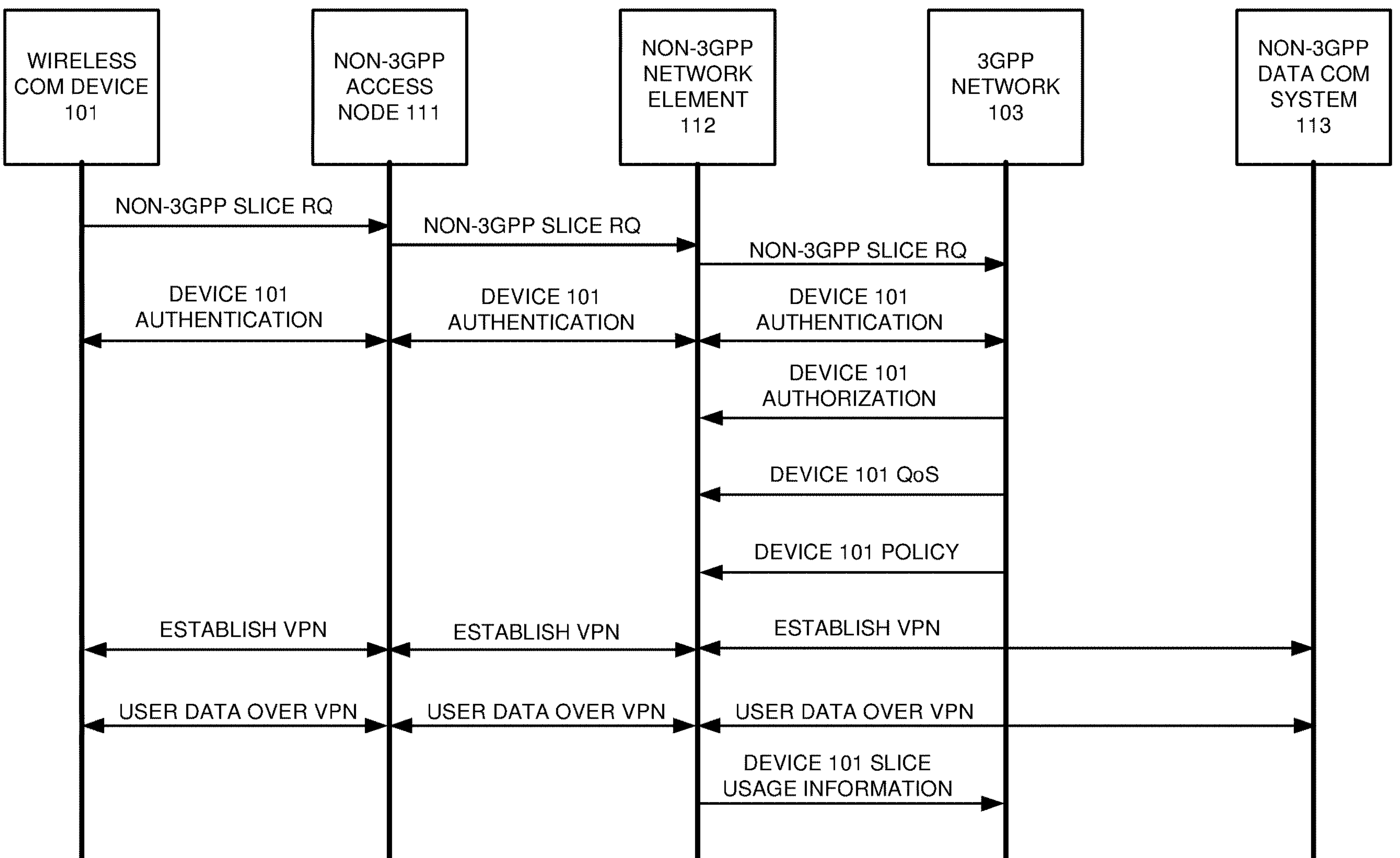
FIG. 3 illustrates an exemplary operation of the wireless communication system to serve the wireless communication device over the non-3GPP network slice.

FIG. 3 illustrates an exemplary operation of wireless communication system 100 to serve wireless communication (COM) device 101 over non-3GPP network slice 102. The operation may vary in other examples. Wireless communication device 101 transfers request (RQ) for a non-3GPP network slice to non-3GPP network element 112 over non-3GPP access node 111. In response to the slice request, non-3GPP network element 112 transfers the slice request to 3GPP network 103 in 3GPP network signaling. In response to the slice request, 3GPP network 103 and wireless communication device 101 exchange authentication data over non-3GPP access node 111 and non-3GPP network element 112 to authenticate wireless communication device 101. In response to the authentication, 3GPP network 103 transfers an authorization for wireless communication device 101 to non-3GPP network element 112. In response to the authorization, 3GPP network 103 transfers a Quality-of Service (QoS) level for wireless communication device 101 to non-3GPP network element 112. The QoS may indicate throughput, latency, error rate, or some other quality metric. In response to the authorization, 3GPP network 103 transfers a network policy for wireless communication device 101 to non-3GPP network element 112. The network policy may indicate a VPN type, data filter, time limit, geographic restriction, or some other data communication rule. In response to the authorization, non-3GPP network element 112 establishes a VPN with wireless communication device 101 over non-3GPP access node 111 per the QoS and policy instructions. Further in response to the authorization, non-3GPP network element 112 establishes another VPN with non-3GPP data communication system 113 per the QoS and policy instructions. Wireless communication device 101 and non-3GPP data communication system 113 exchange user data over the VPNs that traverse non-3GPP access node 111 and non-3GPP network element 112. Non-3GPP network element 112 transfers slice usage information for wireless communication device 101 to 3GPP network 103. The slice usage information may include user data amount, delivered QoS, or some other session characteristics.

Advantageously, wireless communication system 100 supports wireless network slices that exist outside of 3GPP network element 112 like non-3GPP network slice 102. Moreover, non-3GPP network element 112 may be efficiently deployed outside of 3GPP network 103 to properly support non-3GPP network slice 102.

Figure 4:
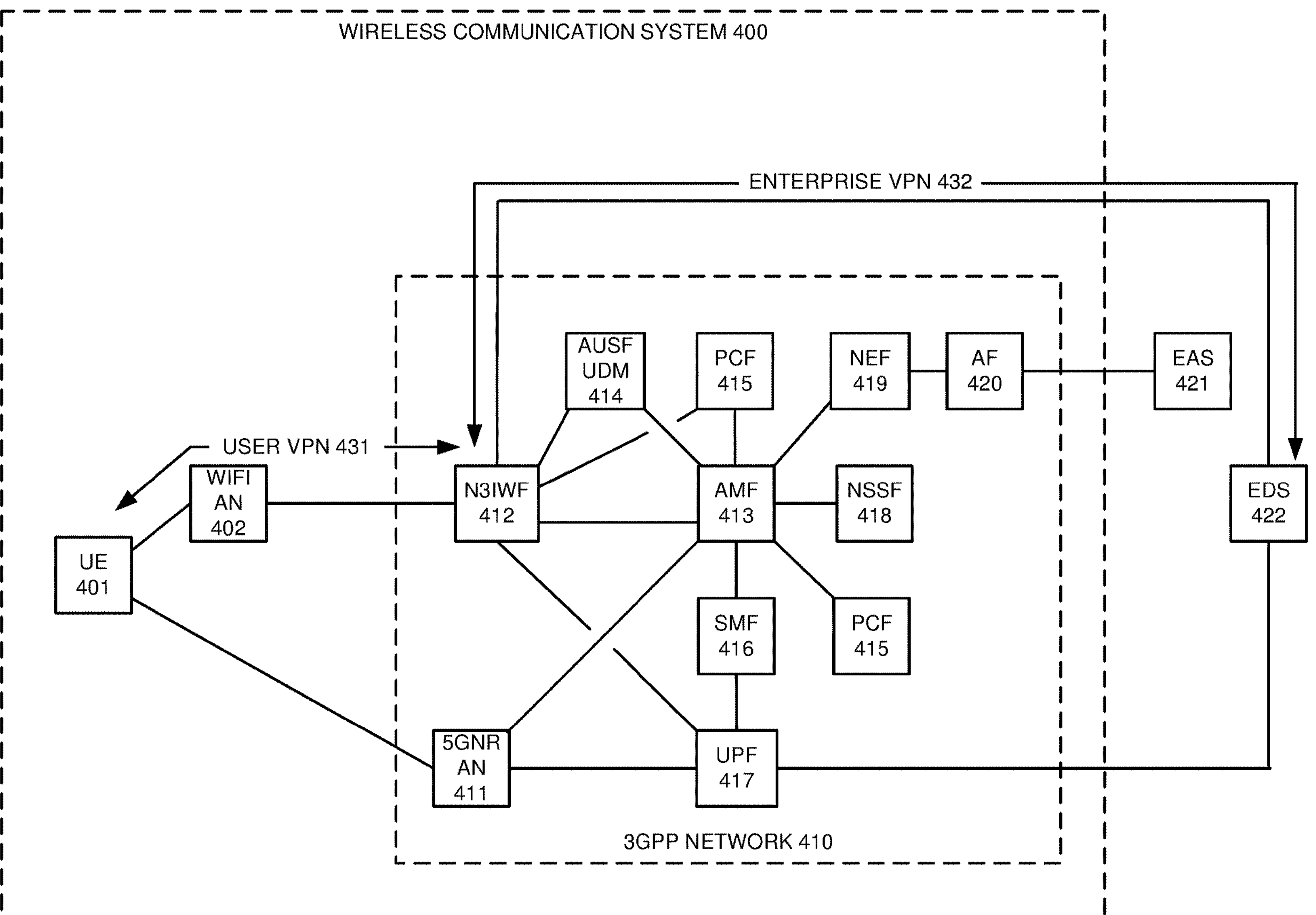
FIG. 4 illustrates an exemplary wireless communication system that uses a Non-3GPP Interworking Function (N3IWF) in a 3GPP network to serve a wireless User Equipment (UE) over a non-3GPP network slice.

FIG. 4 illustrates exemplary wireless communication system 400 that uses Non-3GPP Interworking Function (N3IWF) 412 in 3GPP network 410 to serve wireless User Equipment (UE) 401 over a non-3GPP network slice. Wireless communication system 400 comprises an example of wireless communication system 100, although wireless communication system 100 may differ. Wireless communication system 400 comprises UE 401, WIFI Access Node (AN) 402, and 3GPP network 410. 3GPP network 410 comprises Fifth Generation New Radio (5GNR) AN 411, N3IWF 412, Access and Mobility Management Function (AMF) 413, Authentication Security Function Unified Data Management (AUSF-UDM) 414, Policy Control Function (PCF) 415, Session Management Function (SMF) 416, User Plane Function (UPF) 417, Network Slice Selection Function (NSSF) 418, Network Exposure Function (NEF) 419, and Application Function (AF) 420. AF 420 is coupled to Enterprise Application Server (EAS) 421. EAS 421 comprises a network control computer system that is operated by the enterprise and that is configured to communicate with AFs like AF 420 in 3GPP networks like 3GPP network 410. N3IWF 412 and UPF 417 are coupled to Enterprise Data System (EDS) 422. EDS 422 comprises a data communication computer system that is operated by the enterprise and that is configured to exchange user data with user devices like UE 401 over data communication systems like wireless communication system 400. In this example, the non-3GPP network slice comprises N3IWF 412, user VPN 431, and enterprise VPN 432.

In operation, EAS 421 registers with NEF 419 over AF 420. EAS 421 requests enterprise VPN 432 from NEF 419. NEF 419 transfers the VPN request to AMF 413. AMF 413 directs N3IWF 412 over N2 signaling to establish enterprise VPN 432 with EDS 422. EAS 421 requests the non-3GPP slice for UE 401 from NEF 419. NEF 419 transfers the slice request for UE 401 to AMF 413. AMF 413 transfers the slice request for UE 401 to AUSF-UDM 414 and NSSF 418 for subsequent authorization of UE 401 to use the non-3GPP slice.

In some examples, UE 401 attaches to 5GNR AN 411, and 5GNR AN 411 transfers an initial UE message to AMF 413 over N2 signaling. UE 401 indicates its non-3GPP slice capability to AMF 413 over 5GNR AN 411. AMF 413 interacts with AUSF-UDM 414 and UE 401 to authenticate UE 401 and authorize UE 401 for service. The authentication may use Fifth Generation Authentication and Key Management (5G-AKA), Fifth Generation Extensible Authentication Protocol (EAP-5G), Subscriber Identity Module (SIM) hashing, Extensible Authentication Protocol Transport Layer Security (EAP-TLS), or some other authentication technique. The 5GID might comprise a Network Access Identifier (NAI), Subscriber Permanent Identifier (SUPI), SIM code, digital certificate, CPU serial number, radio ID, and/or some other identifying data for UE 401 or its user.

AMF 413 retrieves some UE context for UE 401 from AUSF-UDM 414 like services, network names, slice types, and the like. AMF 413 and NSSF 418 interact to select one or more network slices for UE 401. The selected slices may be indicated by a 3GPP slice ID and/or a non-3GPP slice ID. AMF 413 and SMF 416 interact to develop additional UE context like QoS levels and network addresses. AMF 413 and PCF 415 interact to develop UE context like network policies. Thus, the UE context includes authorizations, slice IDs, network addresses, QoS levels, network policies, and other data communication information. SMF 416 transfers some UE context to UPF 417. AMF 413 transfers some UE context to 5GNR AN 411 over N2 signaling. 5GNR AN 411 transfers some UE context to UE 401. UE 401 and EDS 422 exchange user data over 5GNR AN 411 and UPF 417. AMF 413 and UE 401 exchange 3GPP Non-Access Stratum (NAS) N1 signaling over 5GNR AN 411.

UE 401 attaches to WIFI AN 402, and the WIFI attachment may occur whether or not UE 401 is attached to 5GNR AN 411. UE 401 may use both 3GPP slices and non-3GPP slices in some examples or may only use non-3GPP slices in other examples. UE 401 and N3IWF 412 establish an IP Security (IPsec) tunnel over WIFI AN 402. UE 401 indicates a non-3GPP slice capability and a 5GID to N3IWF 412. N3IWF 412 transfers the non-3GPP slice capability and 5GID for UE 401 to AMF 413 over N2 signaling. AMF 413 transfers the non-3GPP slice capability and 5GID for UE 401 to AUSF-UDM 414. AUSF-UDM 414 authenticates UE 401 based on the 5GID. The authentication may use 5G-AKA, EAP-5G, SIM hashing, EAP-TLS, or some other authentication technique. The 5GID might comprise a NAI, SUPI, SIM code, digital certificate, CPU serial number, radio ID, and/or some other identifying data for UE 401 or its user. AUSF-UDM 414 authorizes UE 401 for the non-3GPP network slice based on the prior request from EAS 421. AMF 413 retrieves some UE context for UE 401 from AUSF-UDM 414 like services, network names, slice types, and the like. AMF 413 and NSSF 418 interact to select one or more network slices for UE 401. The selected slice includes a non-3GPP slice ID and may also include a 3GPP slice ID. AMF 413 and SMF 416 interact to develop additional UE context like QoS levels and network addresses. AMF 413 and PCF 415 interact to develop UE context like network policies. Thus, the UE context includes authorizations, slice IDs, network addresses, QoS levels, network policies, and other data communication information. AMF 413 transfers some UE context for UE 401 to N3IWF 412 in N2 signaling. N3IWF 412 transfers some UE context to UE 401. In response to the UE context for UE 401, N3IWF 412 establishes user VPN 431 with UE 401 over WIFI AN 402. UE 401 and EDS 422 exchange user data over user VPN 431, N3IWF 412, and enterprise VPN 432 per the UE context. AMF 413 and UE 401 exchange 3GPP NAS N1 signaling over N3IWF 412 and WIFI AN 402.

Figure 5:
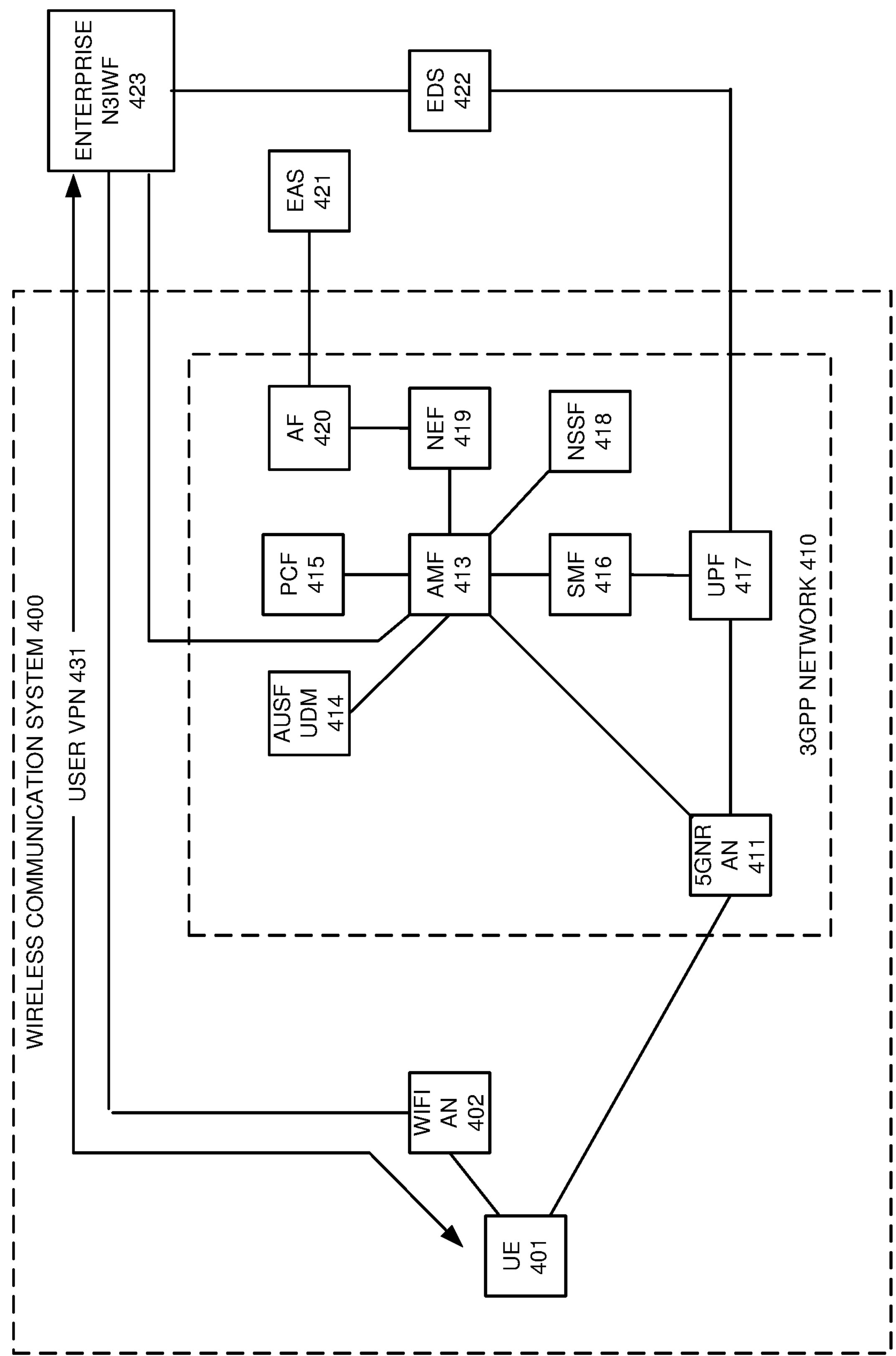
FIG. 5 illustrates an exemplary wireless communication system that uses an ENTERPRISE-N3IWF at an enterprise to serve the wireless UE over a non-3GPP network slice.

FIG. 5 illustrates another example of wireless communication system 400 that uses ENTERPRISE-N3IWF 423 to serve wireless UE 401 over a non-3GPP network slice. In this example, N3IWF 412 in 3GPP network 410 in FIG. 4 has been replaced by ENTERPRISE-N3IWF 423 that is deployed at the enterprise. In other examples, ENTERPRISE-N3IWF 423 and N3IWF 412 operate together to perform the functions performed by N3IWF 412 with respect to FIG. 4. The enterprise comprises a residence, business, agency, school, hospital, or the like. The non-3GPP network slice comprises ENTERPRISE-N3IWF 423 and user VPN 431. UE 401 may use 3GPP slices over 5GNR AN 411 and UPF 417 as described with respect to FIG. 4 or may only use non-3GPP slices as described with respect to FIG. 5.

In operation, ENTERPRISE-N3IWF 423 and AMF 413 establish an IPsec tunnel or some other secure communication channel that carries 3GPP N2 signaling. EAS 421 registers with NEF 419 over AF 420. EAS 421 requests the non-3GPP slice for UE 401 from NEF 419. NEF 419 transfers the slice request for UE 401 to AMF 413. AMF 413 transfers the slice request for UE 401 to AUSF-UDM 414 and NSSF 418. UE 401 logs into WIFI AN 402 and gets an IP address. UE 401 and ENTERPRISE-N3IWF 423 establish an IPsec tunnel or some other secure communication channel over WIFI AN 402. UE 401 indicates a non-3GPP slice capability and possibly a 5GID to ENTERPRISE-N3IWF 423. ENTERPRISE-N3IWF 423 transfers the non-3GPP slice capability and possibly the 5GID for UE 401 to AMF 413 over N2 signaling. AMF 413 transfers the non-3GPP slice capability and possibly the 5GID for UE 401 to AUSF-UDM 414. AUSF-UDM 414 authenticates and authorizes UE 401 and obtains UE context for UE 401 as described with respect to FIG. 4. AMF 413 transfers some UE context for UE 401 to ENTERPRISE-N3IWF 423 in N2 signaling. ENTERPRISE-N3IWF 423 transfers some UE context to UE 401. In response to the UE context for UE 401, ENTERPRISE-N3IWF 423 establishes user VPN 431 with UE 401 over WIFI AN 402. UE 401 and EDS 422 exchange user data over user VPN 431, ENTERPRISE-N3IWF 423, and an enterprise data link per the UE context. AMF 413 and UE 401 exchange 3GPP NAS N1 signaling over ENTERPRISE-N3IWF 423 and WIFI AN 402.

Figure 6:
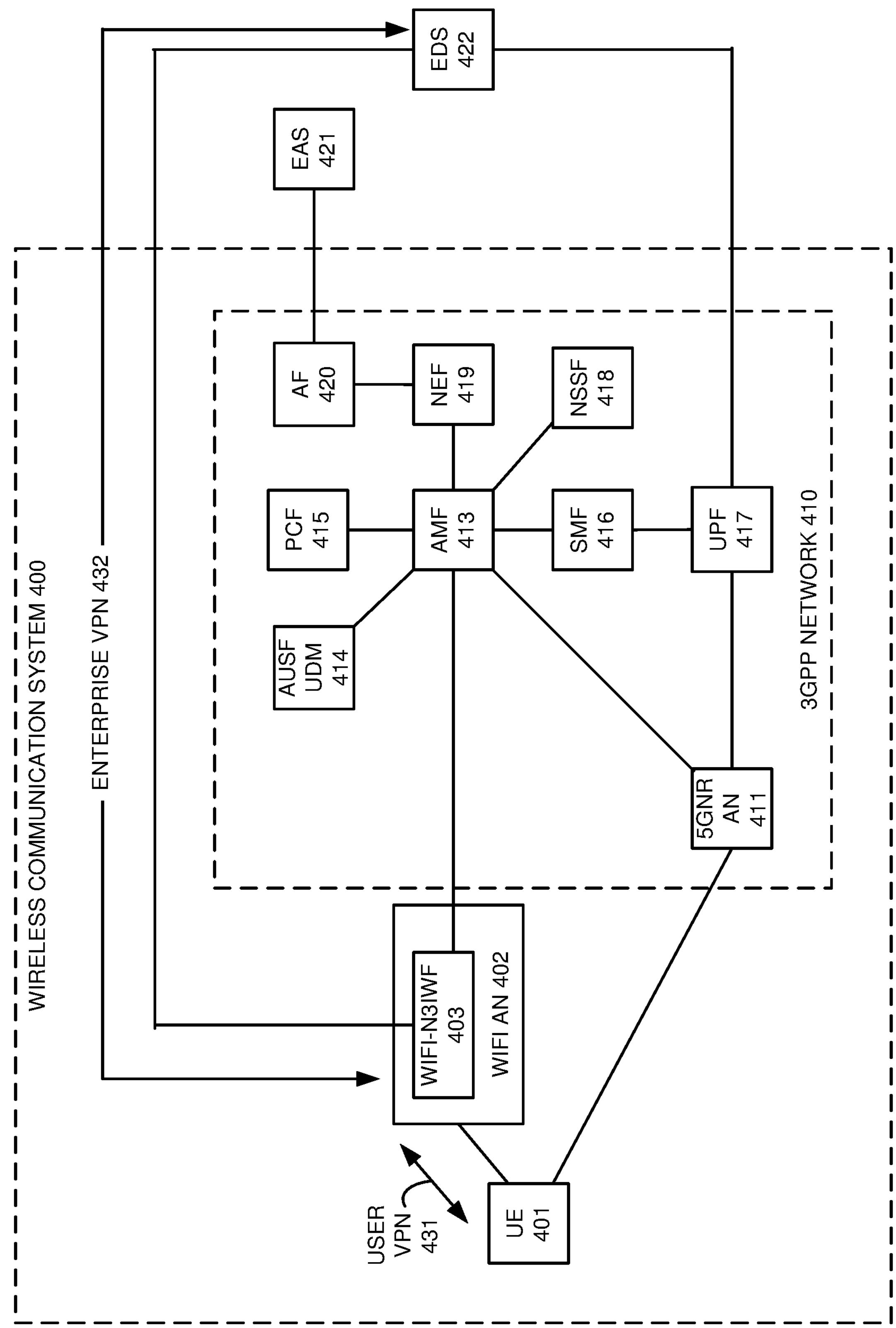
FIG. 6 illustrates an exemplary wireless communication system that uses a WIFI N3IWF in a WIFI access node to serve the wireless UE over a non-3GPP network slice.

FIG. 6 illustrates another example of wireless communication system 400 that uses WIFI-N3IWF 403 in WIFI access node 402 to serve wireless UE 401 over a non-3GPP network slice. In this example, N3IWF 412 in 3GPP network 410 on FIG. 4 has been replaced by WIFI-N3IWF 403 that is deployed in WIFI AN 402. In other examples, WIFI N3IWF 404 and N3IWF 412 operate together to perform the functions performed by N3IWF 412 as described in FIG. 4. Thus, WIFI-N3IWF 403 comprises an N3IWF that is integrated within a non-3GPP wireless access node. The non-3GPP network slice comprises WIFI-N3IWF 403, user VPN 431, and enterprise VPN 432. UE 401 may use 3GPP slices over 5GNR AN 411 and UPF 417 as described with respect to FIG. 4 or may only use non-3GPP slices as described with respect to FIG. 6. WIFI-N3IWF 403 and AMF 413 establish an IPsec tunnel or some other secure communication channel that carries 3GPP N2 signaling. EAS 421 registers with NEF 419 over AF 420. EAS 421 requests the non-3GPP slice for UE 401 from NEF 419. NEF 419 transfers the slice request for UE 401 to AMF 413. AMF 413 transfers the slice request for UE 401 to AUSF-UDM 414 and NSSF 418. UE 401 logs into WIFI AN 402 and gets an IP address. UE 401 and WIFI-N3IWF 403 establish an IPsec tunnel or some other secure communication channel over WIFI AN 402. UE 401 indicates a non-3GPP slice capability and possibly a 5GID to WIFI-N3IWF 403. WIFI-N3IWF 403 transfers the non-3GPP slice capability and possibly the 5GID for UE 401 to AMF 413 over N2 signaling that traverses the IPsec tunnel. AMF 413 transfers the non-3GPP slice capability and possibly the 5GID for UE 401 to AUSF-UDM 414. AUSF-UDM 414 authenticates and authorizes UE 401 and obtains UE context for UE 401 as described with respect to FIG. 4. AMF 413 transfers some UE context for UE 401 to WIFI-N3IWF 403 in N2 signaling. WIFI-N3IWF 403 transfers some UE context to UE 401. In response to the UE context for UE 401, WIFI-N3IWF 403 establishes user VPN 431 with UE 401 over WIFI AN 402. Further in response to the UE context for UE 401, WIFI-N3IWF 403 establishes enterprise VPN 432 with EDS 422. UE 401 and EDS 422 exchange user data over user VPN 431, WIFI-N3IWF 403, and enterprise VPN 432 per the UE context. AMF 413 and UE 401 exchange 3GPP NAS N1 signaling over WIFI-N3IWF 403 and WIFI AN 402.

Figure 7:
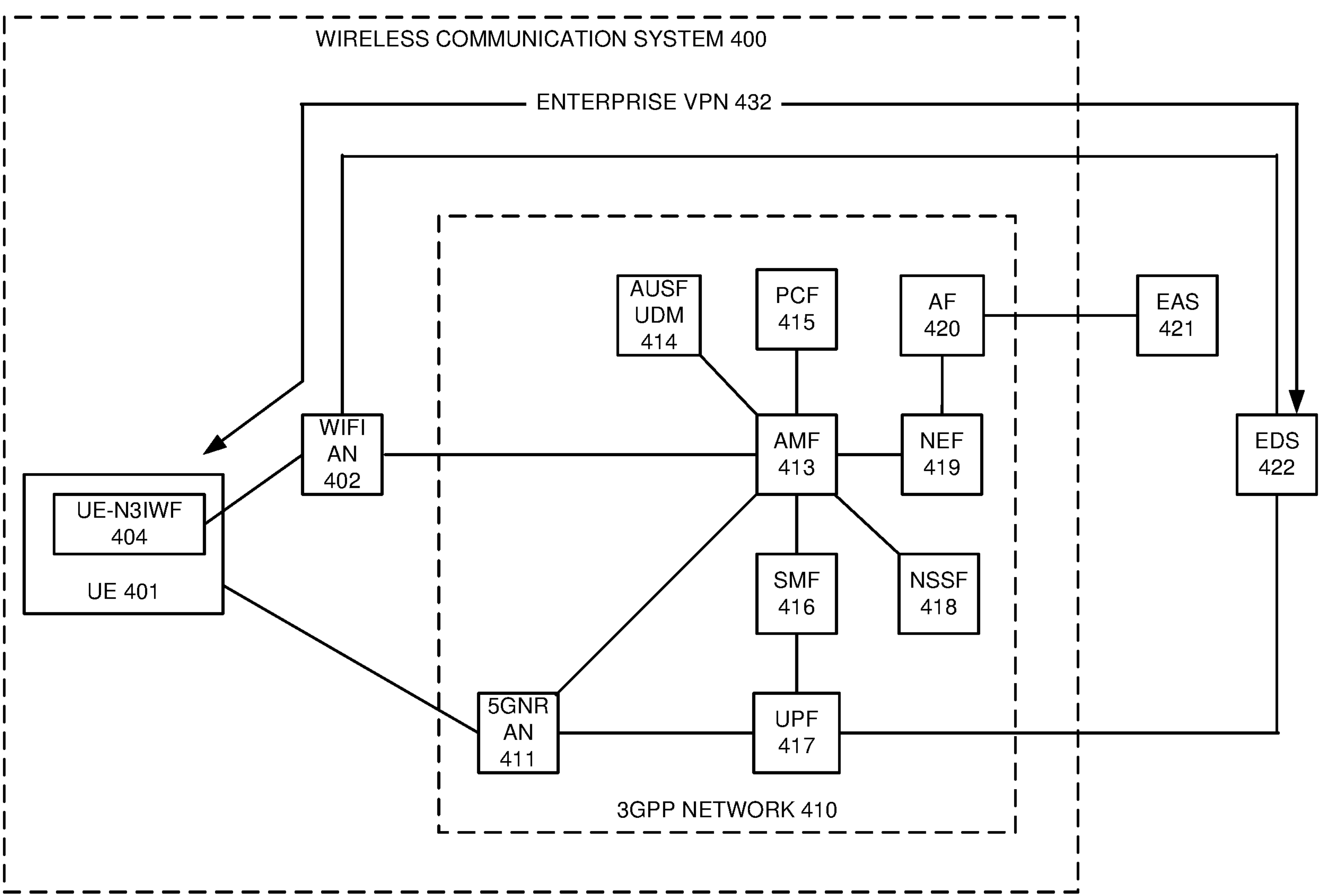
FIG. 7 illustrates an exemplary wireless communication system that uses a UE-N3IWF in the UE to serve the wireless UE over a non-3GPP network slice.

FIG. 7 illustrates another example of wireless communication system 400 that uses UE-N3IWF 404 in UE 401 to serve wireless UE 401 over a non-3GPP network slice. In this example, N3IWF 412 in 3GPP network 410 on FIG. 4 has been replaced by UE-N3IWF 404 that is deployed in UE 401. In other examples, UE-N3IWF 404 and N3IWF 412 operate together to perform the functions that are performed by N3IWF 412 with respect to FIG. 4. Thus, UE-N3IWF 404 comprises an N3IWF that is integrated within a wireless user device. The non-3GPP network slice comprises UE-N3IWF 404 and enterprise VPN 432. UE 401 may use 3GPP slices over 5GNR AN 411 and UPF 417 as described with respect to FIG. 4 or may only use non-3GPP slices as described with respect to FIG. 7.

EAS 421 registers with NEF 419 over AF 420. EAS 421 requests the non-3GPP slice for UE 401 from NEF 419. NEF 419 transfers the slice request for UE 401 to AMF 413. AMF 413 transfers the slice request for UE 401 to AUSF-UDM 414 and NSSF 418. UE 401 logs into WIFI AN 402 and gets an IP address. UE-N3IWF 404 and AMF 413 establish an IPsec tunnel or some other secure communication channel that carries 3GPP N2 signaling over WIFI AN 402. UE 401 indicates a non-3GPP slice capability and possibly a 5GID to UE-N3IWF 404. UE-N3IWF 404 transfers the non-3GPP slice capability and possibly the 5GID for UE 401 to AMF 413 over N2 signaling. AMF 413 transfers the non-3GPP slice capability and possibly the 5GID for UE 401 to AUSF-UDM 414. AUSF-UDM 414 authenticates and authorizes UE 401 and obtains UE context for UE 401 as described with respect to FIG. 4. AMF 413 transfers some UE context for UE 401 to UE-N3IWF 404 in N2 signaling. UE-N3IWF 404 transfers some UE context to 3GPP components in UE 401. In response to the UE context for UE 401, UE-N3IWF 404 establishes enterprise VPN 432 with EDS 422 over WIFI AN 402. UE 401 and EDS 422 exchange user data over enterprise VPN 432 per the UE context. AMF 413 and UE 401 exchange 3GPP NAS N1 signaling over WIFI AN 402 and UE-N3IWF 404.

Figure 8:
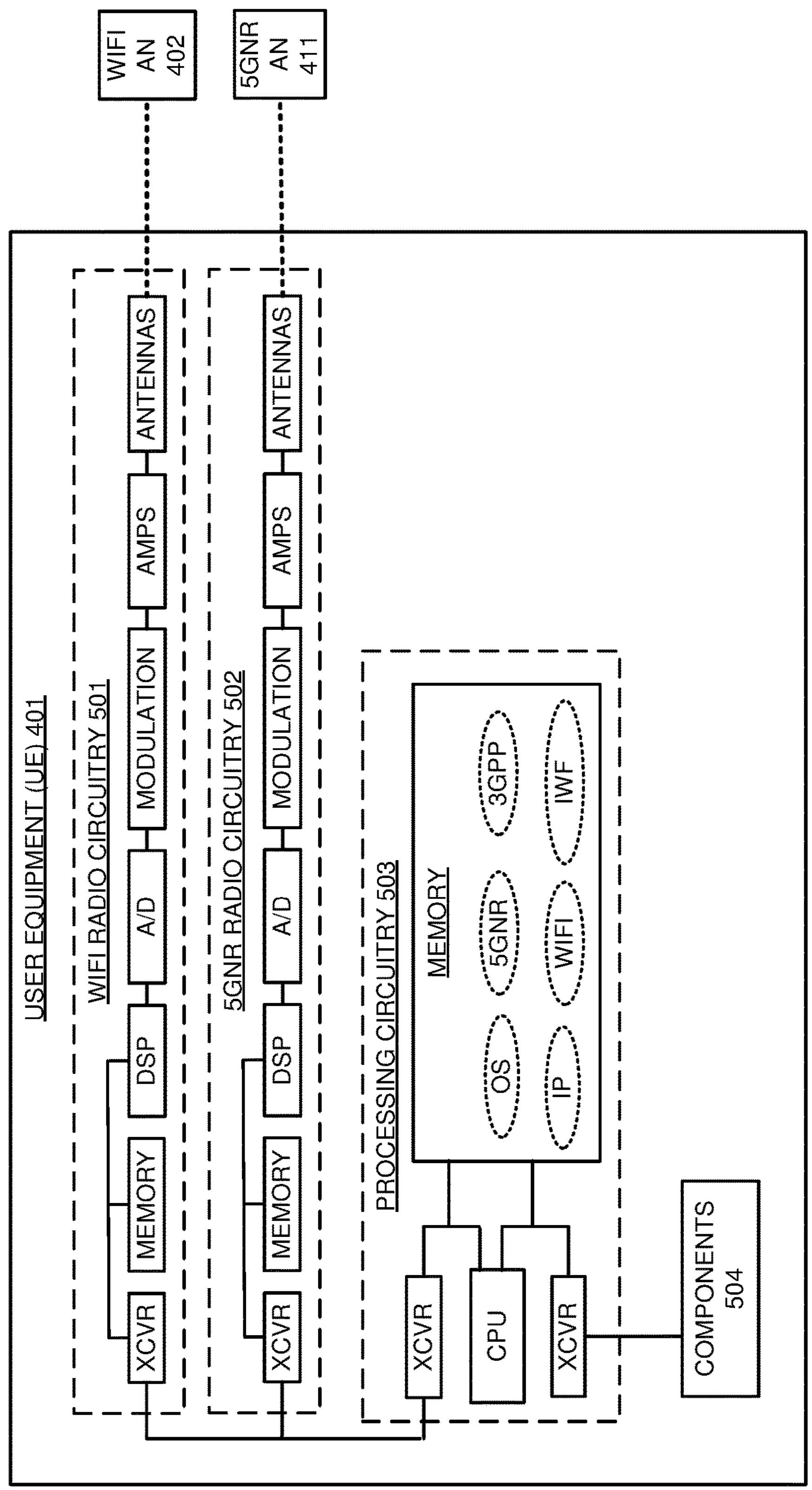
FIG. 8 illustrates an exemplary wireless UE that uses a non-3GPP network slice.

FIG. 8 illustrates exemplary wireless UE 401 that uses a non-3GPP network slice. UE 401 represents an example of wireless communication device 101 and non-3GPP network element 112, although device 101 and element 112 may differ. UE 401 comprises WIFI radio circuitry 501, 5GNR radio circuitry 502, processing circuitry 503, and components 504. Components 504 comprise sensors, cameras, medical devices, and/or some other user apparatus. Radios 501-502 comprise antennas, amplifiers, filters, modulation, analog-to-digital interfaces, DSPs, memories, and transceivers (XCVRs) that are coupled over bus circuitry. Processing circuitry 503 comprises one or more CPUs, one or more memories, and one or more transceivers that are coupled over bus circuitry. The one or more memories in processing circuitry 503 store software like an Operating System (OS), 5GNR application (5GNR), 3GPP application, Internet Protocol application (IP), WIFI application (WIFI), and Interworking Function application (IWF). In some examples, processing circuitry 503 executes the IWF application to form UE-N3IWF 404, but in other examples, the IWF application is omitted and UE 401 interacts with one of the other N3IWFs that are described herein. In some examples, 5GNR radio circuitry 502 and the 5GNR application is omitted, and UE 401 only uses non-3GPP slices.

The antennas in WIFI radio circuitry 501 exchange WIFI signals with WIFI AN 402. The antennas in 5GNR radio circuitry 502 exchange 5GNR signals with 5GNR AN 411. Transceivers in radios 501-502 are coupled to transceivers in processing circuitry 503. In processing circuitry 503, the one or more CPUs retrieve the software from the one or more memories and execute the software to direct the operation of UE 401 as described herein. Thus, processing circuitry 503 comprise one or more microprocessors and one or more non-transitory, machine-readable storage media that store processing instructions that direct processing circuitry 503 to perform the methods described herein.

The IP and WIFI applications log into WIFI AN 402 over WIFI radio circuitry 501 to get an IP address. The IWF application and AMF 413 establish an IPsec tunnel or some other secure communication channel that carries 3GPP N2 signaling over WIFI radio circuitry 501 and WIFI AN 402. The 3GPP application indicates a non-3GPP slice capability and possibly a 5GID to the IWF application in UE 401. The IWF application transfers the non-3GPP slice capability and possibly the 5GID for UE 401 to AMF 413 over N2 signaling that traverses WIFI radio circuitry 501 and WIFI AN 402. The IWF application receives UE context (authorization, slice ID network addresses, QoS, and network policy) for UE 401 from AMF 413 over N2 signaling. The IWF application also receives UE context for UE 401 in N1 signaling that is transported by N2 signaling and transfers UE context in N1 signaling to the 3GPP application. The IWF application establishes enterprise VPN 432 with EDS 422 over WIFI AN 402 per the UE context. The 3GPP application exchanges user data with EDS 422 over the IWF application and VPN 432 per the UE context. The 3GPP application and AMF 413 exchange N1 signaling over the IWF application and WIFI AN 402.

In some examples, the IWF application in UE 401 exchanges signaling directly with AUSF-UDM 414, PCF 415, and NSSF 418 without using AMF 413. Thus, the IWF application authenticates and authorizes UE 401 over AUSF-UDM 414. The IWF application selects a non-3GPP slice instance for UE 401 by using NSSF 418. The IWF application retrieves UE context for UE 401 from AUSF-UDM 414. The IWF application obtains network policy for UE 401 from PCF 415.

Figure 9:
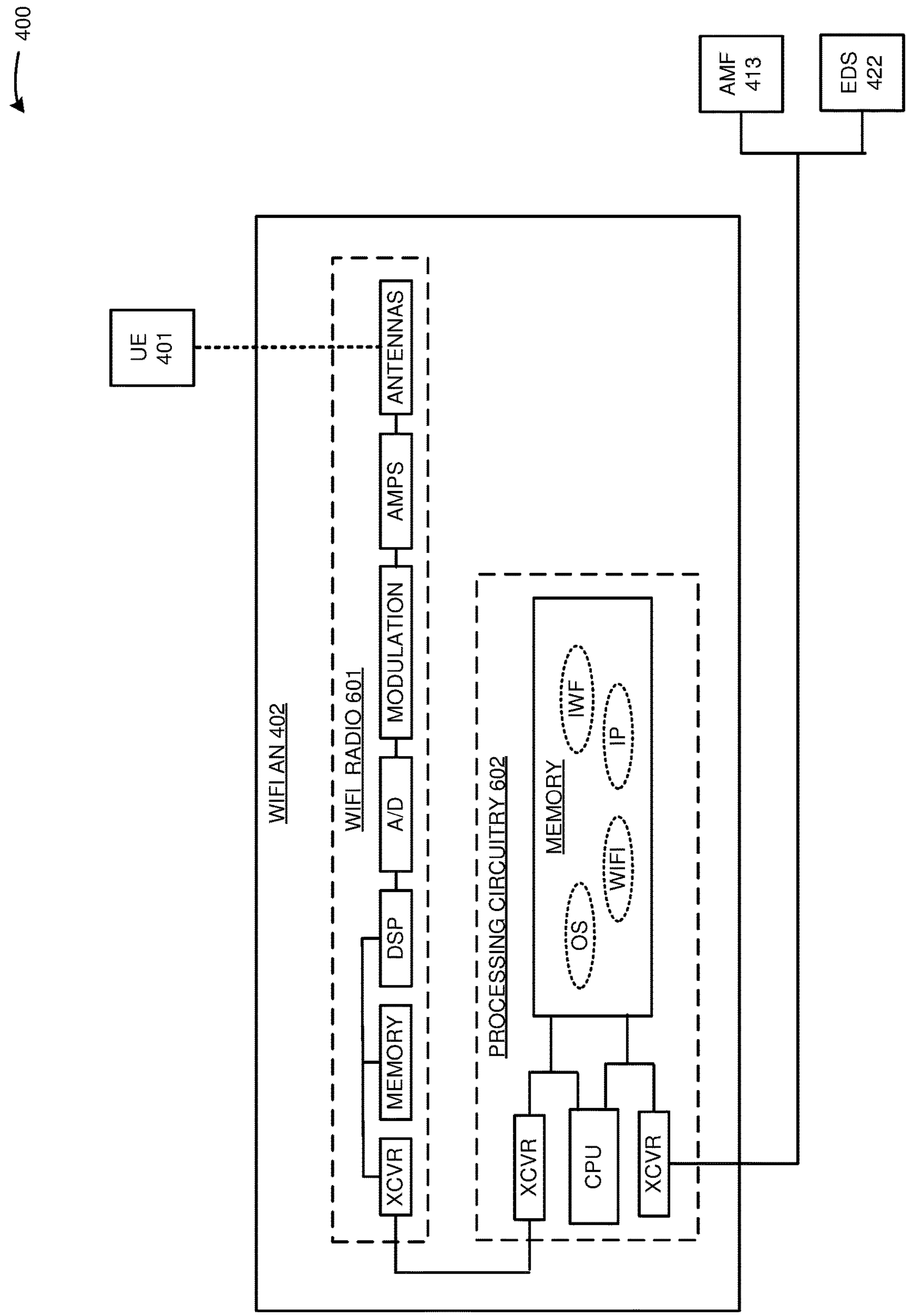
FIG. 9 illustrates an exemplary WIFI access node that serves a wireless UE that uses a non-3GPP network slice.

FIG. 9 illustrates exemplary WIFI access node 402 that serves wireless UE 401 which uses a non-3GPP network slice. WIFI AN 402 comprises an example of non-3GPP access node 111 and non-3GPP network element 112, although node 111 and element 112 may differ. WIFI AN 402 comprises WIFI radio 601 and processing circuitry 602. Radio 601 comprises antennas, amplifiers, filters, modulation, analog-to-digital interfaces, DSPs, memories, and transceivers (XCVRs) that are coupled over bus circuitry. Processing circuitry 602 comprises one or more CPUs, one or more memories, and one or more transceivers that are coupled over bus circuitry. The one or more memories in processing circuitry 602 store software like an Operating System (OS), WIFI application (WIFI), IP application (IP), and in some examples, an IWF application (IWF). The antennas in WIFI radio 601 exchange WIFI signals with UE 401. Transceivers in radio 601 are coupled to transceivers in processing circuitry 602. Transceivers in processing circuitry 602 are coupled to transceivers in EDS 422 and AMF 413. In processing circuitry 602, the one or more CPUs retrieve the software from the one or more memories and execute the software to direct the operation of WIFI AN 402 as described herein. Thus, processing circuitry 602 comprises one or more microprocessors and one or more non-transitory machine-readable storage media that store processing instructions that direct processing circuitry 602 to perform the methods described herein.

In examples where WIFI-N3IWF 403 is not used, WIFI AN 402 may operate as described in FIGS. 4, 5, and 7. The use of WIFI-N3IWF 403 within WIFI AN 402 as shown on FIG. 6 is now described. The IP and WIFI applications allow UE 401 to log into WIFI AN 402 over WIFI radio 601 and get an IP address. The IWF application and AMF 413 establish an IPsec tunnel or some other secure communication channel that carries 3GPP N2 signaling over WIFI radio 601. The IWF application receives the non-3GPP slice capability and possibly a 5GID from UE 401. The IWF application transfers the non-3GPP slice capability and possibly the 5GID for UE 401 to AMF 413 over N2 signaling that traverses WIFI radio 601. The IWF application receives UE context (authorization, slice ID, network addresses, QoS, and network policy) for UE 401 from AMF 413 over N2 signaling. The IWF application also receives UE context for UE 401 in N1 signaling that is transported by the N2 signaling and transfers this UE context in the N1 signaling to UE 401. The IWF application establishes enterprise VPN 431 with UE 401 over WIFI radio 601 per the UE context. The IWF application establishes enterprise VPN 432 with EDS 422 per the UE context. The IWF application exchanges user data with UE 401 over user VPN 431 and with EDS 422 over enterprise VPN 432 per the UE context.

In some examples, the IWF application in WIFI AN 402 exchanges signaling directly with AUSF-UDM 414, PCF 415, and NSSF 418 without using AMF 413. Thus, the IWF application authenticates and authorizes UE 401 over AUSF-UDM 414. The IWF application selects a non-3GPP slice instance for UE 401 by using NSSF 418. The IWF application retrieves UE context for UE 401 from AUSF-UDM 414. The IWF application obtains network policy for UE 401 from PCF 415.

Figure 10:
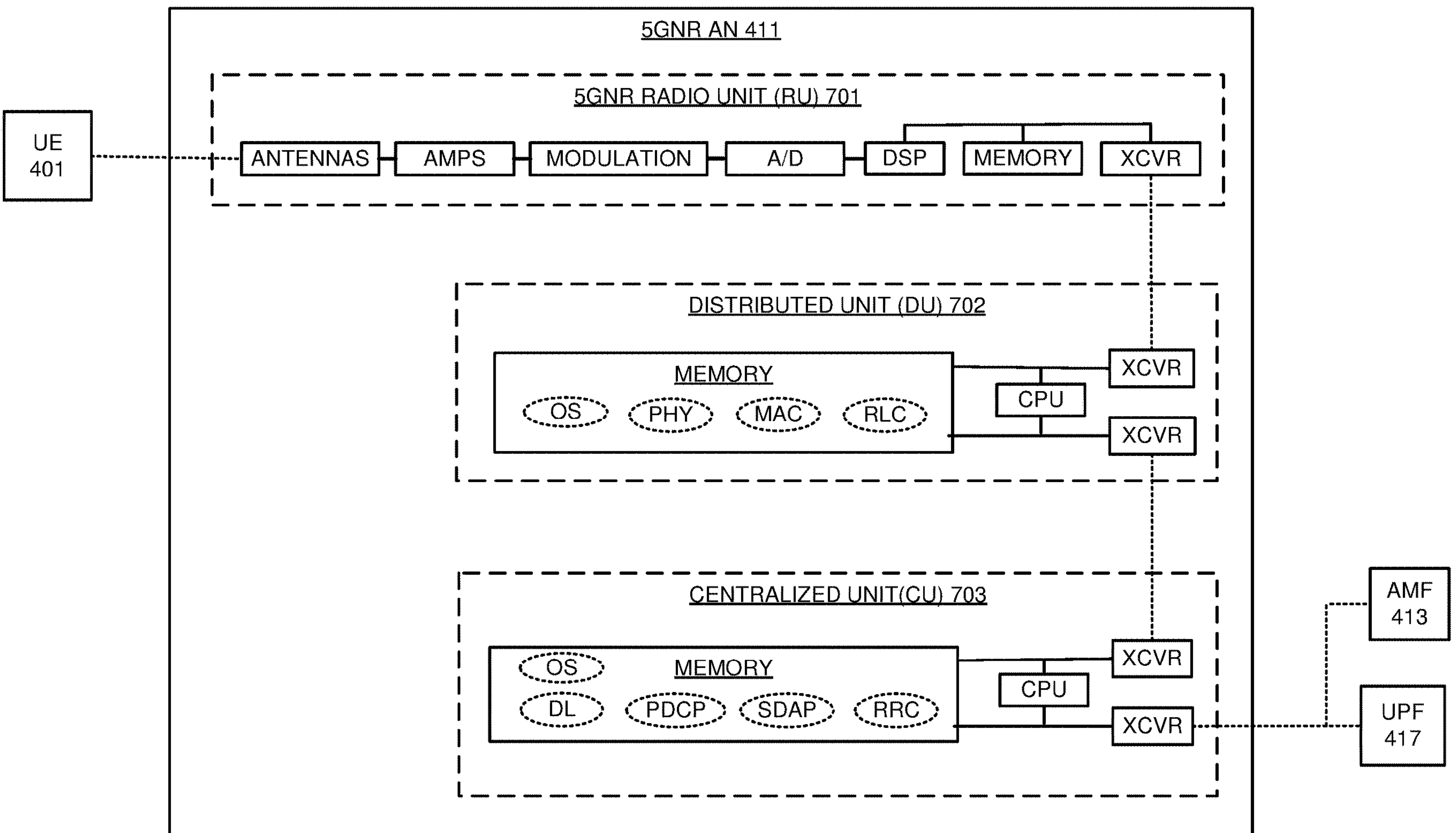
FIG. 10 illustrates an exemplary Fifth Generation New Radio (5GNR) access node that serves a wireless UE that uses a non-3GPP network slice.

FIG. 10 illustrates exemplary Fifth Generation New Radio (5GNR) access node 411 that serves wireless UE 401 that uses a non-3GPP network slice. 5GNR AN 411 comprises 5GNR Radio Unit (RU) 701, Distributed Unit (DU) 702, and Centralized Unit (CU) 703. 5GNR RU 701 comprises antennas, amplifiers, filters, modulation, analog-to-digital interfaces, DSP, memory, radio applications, and transceivers that are coupled over bus circuitry. DU 702 comprises memory, CPU, user interfaces and components, and transceivers that are coupled over bus circuitry. The memory in DU 702 stores operating system and 5GNR network applications for Physical Layer (PHY), Media Access Control (MAC), and Radio Link Control (RLC). CU 703 comprises memory, CPU, and transceivers that are coupled over bus circuitry. The memory in CU 703 stores an operating system and 5GNR network applications for Packet Data Convergence Protocol (PDCP), Service Data Adaption Protocol (SDAP), and Radio Resource Control (RRC). The antennas in 5GNR RU 701 are wirelessly coupled to UE 401 over 5GNR links. Transceivers in 5GNR RU 701 are coupled to transceivers in DU 702. Transceivers in DU 702 are coupled to transceivers in CU 703. Transceivers in CU 703 are coupled AMF 413, UPF 417, and NEF 419. The DSP and CPU in RU 701, DU 702, and CU 703 execute the radio applications, operating systems, and network applications to exchange data and signaling with UE 401, AMF 413, and UPF 417 as described herein.

Figure 11:
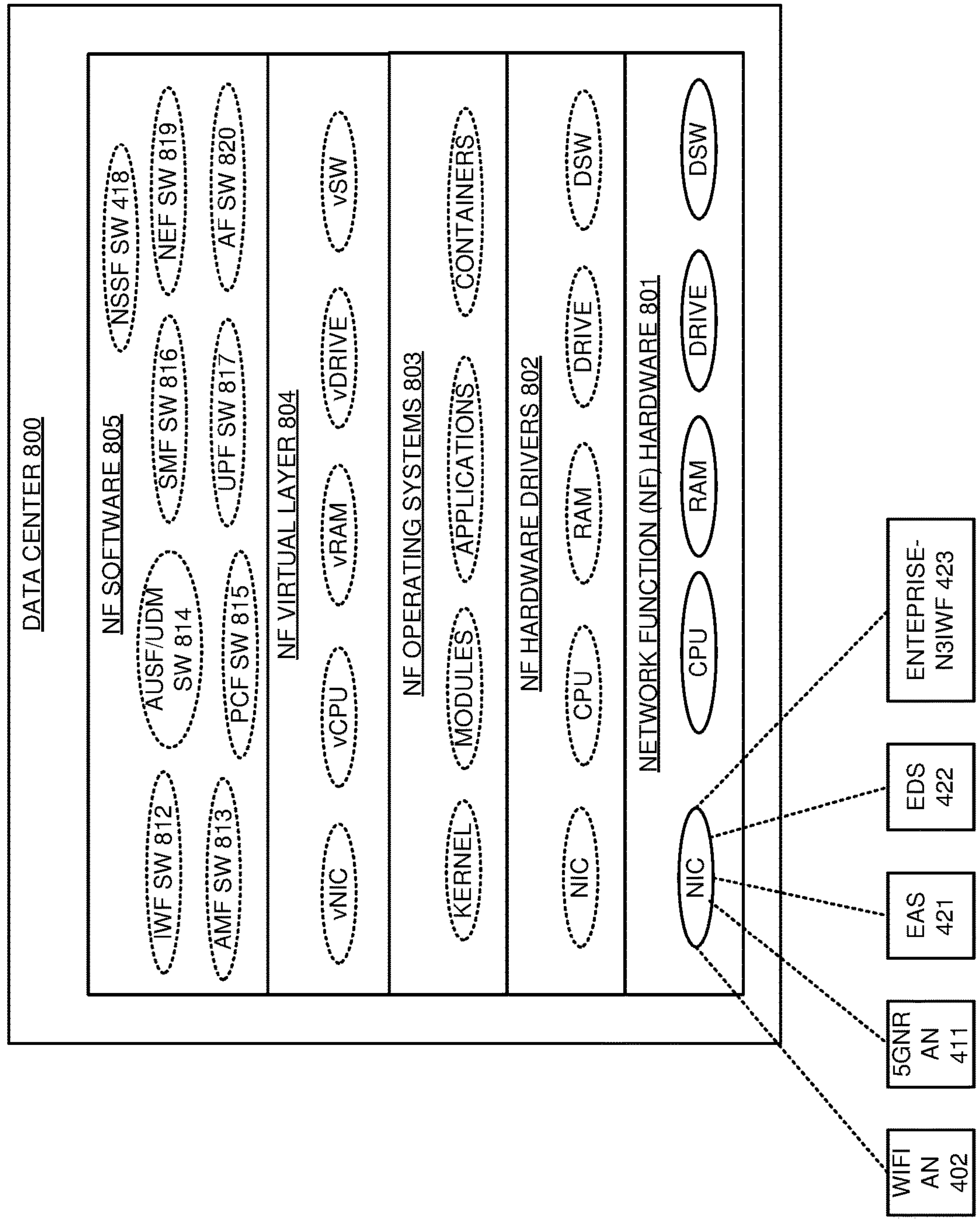
FIG. 11 illustrates an exemplary data center that hosts a 3GPP network that serves a wireless UE over a non-3GPP network slice.

FIG. 11 illustrates exemplary data center 800 that hosts 3GPP network 410 which serves wireless UE 401 over a non-3GPP network slice. Data center 800 comprises an example of non-3GPP network element 112 and 3GPP network 103, although element 112 and network 103 may differ. Data center 800 comprises NF hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, applications, and containers. NF virtual layer 804 comprises vNIC, vCPU, vRAM, vDRIVE, and vSW. NF SW 805 comprises IWF SW 812, AMF SW 813, AUSF-UDM SW 814, PCF SW 815, SMF SW 816, UPF SW 817, NSSF SW 818, NEF SW 819, and AF SW 820. The NIC in NF hardware 801 are coupled to WIFI AN 402, 5GNR AN 411, EAS 421, EDS 422, and in some examples, ENTERPRISE-N3IWF 423. NF hardware 801 executes NF hardware drivers 802, NF operating systems 803, NF virtual layer 804, and NF SW 805 to form and operate N3IWF 412, AMF 413, AUSF-UDM 414, PCF 415, SMF 416, UPF 417, NSSF 418, NEF 419, and AF 420. Thus, data center 800 comprises one or more microprocessors and one or more non-transitory machine-readable storage media that store processing instructions that direct data center 800 to perform the methods described herein. Network data center 800 may be located at a single site or be distributed across multiple geographic locations.

EAS 421 registers with NEF SW 819 over AF SW 820. In some examples, EAS 421 requests enterprise VPN 432 from NEF SW 819. NEF SW 819 transfers the VPN request to AMF SW 813. In some examples, AMF SW 813 directs IWFs 403-404 or IWF SW 813 to establish enterprise VPN 432 with EDS 422. EAS 421 requests a non-3GPP slice for UE 401 from NEF SW 819. NEF SW 819 transfers the slice request for UE 401 to AMF SW 813. AMF SW 813 transfers the slice request for UE 401 to AUSF-UDM SW 814 and NSSF SW 818.

Examples that use N3IWF SW 812 which forms a portion of N3IWF 412 are now described. UE 401 and N3IWF SW 812 establish an IPsec tunnel or some other secure communication channel over WIFI AN 402. UE 401 indicates a non-3GPP slice capability and a possibly 5GID to N3IWF SW 812. N3IWF SW 812 transfers the non-3GPP slice capability and possibly the 5GID for UE 401 to AMF SW 813. AMF SW 813 transfers the non-3GPP slice capability and possibly the 5GID for UE 401 to AUSF-UDM SW 814. AUSF-UDM SW 814 authorizes UE 401 as described with respect to FIG. 4. AUSF-UDM SW 814 authorizes UE 401 for the non-3GPP network slice based on the prior request from EAS 421. AUSF-UDM SW 814 transfers the authorization for UE 401 to use the non-3GPP network slice along with other UE context to AMF SW 813. AMF SW 813 retrieves a slice ID for the authorized non-3GPP network slice for UE 401 from NSSF SW 818. AMF SW 813 retrieves network policy for UE 401 from PCF SW 815. AMF SW 813 transfers UE context (the authorization, slice ID, network addresses, QoS, and network policy) for UE 401 to N3IWF SW 812 in N2 signaling. In response to the UE context for UE 401, N3IWF SW 812 establishes user VPN 431 with UE 401 over WIFI AN 402. UE 401 and EDS 422 exchange user data over user VPN 431, N3IWF SW 812, and enterprise VPN 432 per the UE context. AMF SW 813 and UE 401 exchange 3GPP NAS N1 signaling over the N3IWF SW 812 and WIFI AN 402.

In some examples, N3IWF SW 812 exchanges signaling directly with AUSF-UDM SW 814, PCF SW 815, and NSSF SW 818 without using AMF 413. Thus, N3IWF SW 812 authenticates and authorizes UE 401 over AUSF-UDM SW 814. N3IWF SW 812 selects a non-3GPP slice instance for UE 401 by using NSSF SW 818. N3IWF SW 812 retrieves UE context for UE 401 from AUSF-UDM SW 814. N3IWF SW 812 obtains network policy for UE 401 from PCF SW 815.

Examples that use ENTERPRISE-N3IWF 423 are now described. AMF SW 813 and ENTERPRISE-N3IWF 423 establish an IPsec tunnel or some other secure communication channel. ENTERPRISE-N3IWF 423 transfers a non-3GPP slice capability and possibly a 5GID for UE 401 to AMF SW 813. AMF SW 813 transfers the non-3GPP slice capability and possibly the 5GID for UE 401 to AUSF-UDM SW 814. AUSF-UDM SW 814 authorizes UE 401 as described with respect to FIG. 4. AUSF-UDM SW 814 authorizes UE 401 for the non-3GPP network slice based on the prior request from EAS 421. AUSF-UDM SW 814 transfers the authorization for UE 401 to use the non-3GPP network slice along with other UE context to AMF SW 813. AMF SW 813 retrieves a slice ID for the authorized non-3GPP network slice for UE 401 from NSSF SW 818. AMF SW 813 retrieves network policy for UE 401 from PCF SW 815. AMF SW 813 transfers the UE context (authorization, slice ID network addresses QoS, and network policy) for UE 401 to ENTERPRISE-N3IWF 423 in N2 signaling. In response to the UE context for UE 401, ENTERPRISE-N3IWF 423 establishes user VPN 431 with UE 401 over WIFI AN 402. UE 401 and EDS 422 exchange user data over user VPN 431, ENTERPRISE-N3IWF 423, and an enterprise data link per the UE context. AMF SW 813 and UE 401 exchange 3GPP NAS N1 signaling over the ENTERPRISE-N3IWF 423 and WIFI AN 402.

In some examples, ENTERPRISE-N3IWF 423 exchanges signaling directly with AUSF-UDM SW 814, PCF SW 815, and NSSF SW 818 without using AMF 413. Thus, ENTERPRISE-N3IWF 423 authenticates and authorizes UE 401 over AUSF-UDM SW 814. ENTERPRISE-N3IWF 423 selects a non-3GPP slice instance for UE 401 by using NSSF SW 818. ENTERPRISE-N3IWF 423 retrieves UE context for UE 401 from AUSF-UDM SW 814. ENTERPRISE-N3IWF 423 obtains network policy for UE 401 from PCF SW 815.

Examples that use WIFI-N3IWF 403 are now described. WIFI-N3IWF 403 establishes an IPsec tunnel or some other secure communication channel with AMF SW 813. WIFI-N3IWF 403 transfers a non-3GPP slice capability and possibly a 5GID for UE 401 to AMF SW 813. AMF SW 813 transfers the non-3GPP slice capability and possibly the 5GID for UE 401 to AUSF-UDM SW 814. AUSF-UDM SW 814 authorizes UE 401 as described with respect to FIG. 4. AUSF-UDM SW 814 authorizes UE 401 for the non-3GPP network slice based on the prior request from EAS 421. AUSF-UDM SW 814 transfers the authorization for UE 401 to use the non-3GPP network slice along with other UE context to AMF SW 813. AMF SW 813 retrieves a slice ID for the authorized non-3GPP network slice for UE 401 from NSSF SW 818. AMF SW 813 retrieves network policy for UE 401 from PCF SW 815. AMF SW 813 transfers the UE context (authorization, slice ID, network addresses, QoS, and network policy) for UE 401 to WIFI-N3IWF 403 in N2 signaling. AMF SW 813 and UE 401 exchange 3GPP NAS N1 signaling over the WIFI-N3IWF 403 and WIFI AN 402.

In some examples, WIFI-N3IWF 403 exchanges signaling directly with AUSF-UDM SW 814, PCF SW 815, and NSSF SW 818 without using AMF 413. Thus, WIFI-N3IWF 403 authenticates and authorizes UE 401 over AUSF-UDM SW 814. WIFI-N3IWF 403 selects a non-3GPP slice instance for UE 401 by using NSSF SW 818. WIFI-N3IWF 403 retrieves UE context for UE 401 from AUSF-UDM SW 814. WIFI-N3IWF 403 obtains network policy for UE 401 from PCF SW 815.

Examples that use UE-N3IWF 404 are now described. UE-N3IWF 404 establishes an IPsec tunnel or some other secure communication channel with AMF SW 813. UE-N3IWF 404 transfers a non-3GPP slice capability and possibly a 5GID for UE 401 to AMF SW 813. AMF SW 813 transfers the non-3GPP slice capability and possibly the 5GID for UE 401 to AUSF-UDM SW 814. AUSF-UDM SW 814 authorizes UE 401 for the non-3GPP network slice based on the prior request from EAS 421. AUSF-UDM SW 814 transfers the authorization for UE 401 to use the non-3GPP network slice along with other UE context to AMF SW 813. AMF SW 813 retrieves a slice ID for the authorized non-3GPP network slice for UE 401 from NSSF SW 818. AMF SW 813 retrieves network policy for UE 401 from PCF SW 815. AMF SW 813 transfers the UE context (authorization, slice ID, network addresses, QoS, and network policy) for UE 401 to UE-N3IWF 404 in N2 signaling. AMF SW 813 and UE 401 exchange 3GPP NAS N1 signaling over the UE-N3IWF 404 and WIFI AN 402.

In some examples, UE-N3IWF 404 exchanges signaling directly with AUSF-UDM SW 814, PCF SW 815, and NSSF SW 818 without using AMF 413. Thus, UE-N3IWF 404 authenticates and authorizes UE 401 over AUSF-UDM SW 814. UE-N3IWF 404 selects a non-3GPP slice instance for UE 401 by using NSSF SW 818. UE-N3IWF 404 retrieves UE context for UE 401 from AUSF-UDM SW 814. UE-N3IWF 404 obtains network policy for UE 401 from PCF SW 815.

Figure 12:
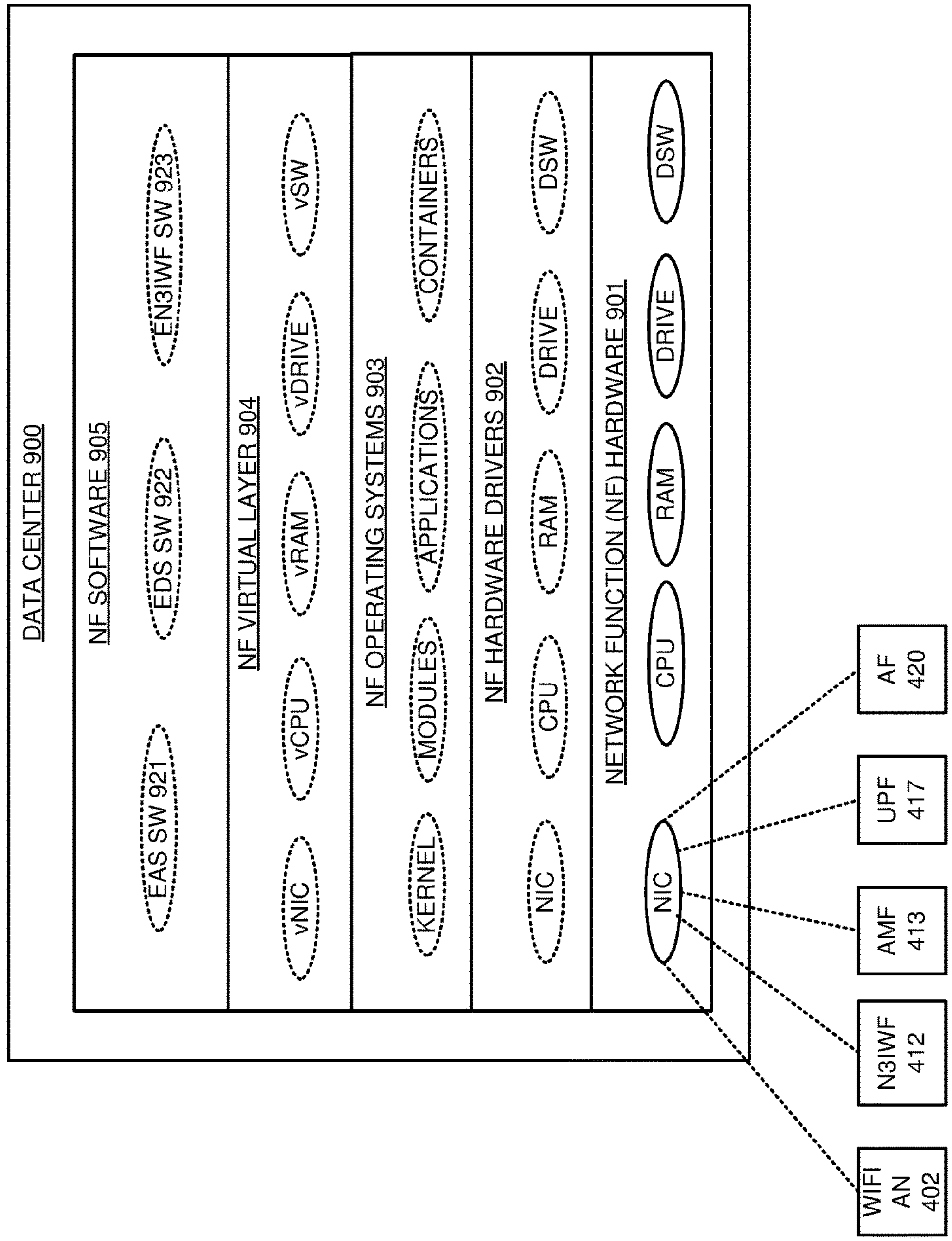
FIG. 12 illustrates an exemplary data center that hosts an enterprise network that serves a wireless UE over a non-3GPP network slice.

FIG. 12 illustrates exemplary data center 900 that hosts an enterprise network that serves wireless UE 401 over a non-3GPP network slice. Data center 900 comprises an example of non-3GPP network element 112 and non-3GPP data communication system 113, although element 112 and system 113 may differ. Data center 900 comprises NF hardware 901, NF hardware drivers 902, NF operating systems 903, NF virtual layer 904, and NF SW 905. NF hardware 901 comprises NICs, CPU, RAM, DRIVE, and DSW. NF hardware drivers 902 comprise software that is resident in the NIC, CPU, RAM, DRIVE, and DSW. NF operating systems 903 comprise kernels, modules, applications, and containers. NF virtual layer 904 comprises vNIC, vCPU, vRAM, vDRIVE, and vSW. NF SW 905 comprises EAS SW 921, EDS SW 922, and in some examples, ENTERPRISE-N3IWF SW 923. The NIC in NF hardware 901 are coupled to WIFI AN 402, N3IWF 412, AMF 413, UPF 417, and AF 420. NF hardware 901 executes NF hardware drivers 902, NF operating systems 903, NF virtual layer 904, and NF SW 905 to form and operate EAS 421, EDS 422, and ENTERPRISE-N3IWF 423. Thus, data center 900 comprises one or more microprocessors and one or more non-transitory machine-readable storage media that store processing instructions that direct data center 900 to perform the methods described herein. Network data center 900 may be located at a single site or be distributed across multiple geographic locations.

Examples that use N3IWF 412 as shown on FIG. 4 are now described. EAS SW 921 registers with NEF 419 over AF 420. EAS SW 921 requests VPN 432 from NEF 419 over AF 420. N3IWF 412 establishes enterprise VPN 432 with EDS SW 922. EAS SW 921 requests a non-3GPP slice for UE 401 from NEF 419 over AF 420. UE 401 and EDS SW 922 exchange user data over user VPN 431, N3IWF 412, and enterprise VPN 432 per the UE context.

Examples that use ENTERPRISE-N3IWF SW 923 as shown on FIG. 5 are now described. AMF 413 and ENTERPRISE-N3IWF SW 923 establish an IPsec tunnel or some other secure communication channel for N2 signaling. EAS SW 921 registers with NEF 419 over AF 420. EAS SW 921 requests a non-3GPP slice for UE 401 from NEF 419 over AF 420. UE 401 and ENTERPRISE-N3IWF SW 923 establish an IPsec tunnel or some other secure communication channel. ENTERPRISE-N3IWF SW 923 receives a non-3GPP slice capability and possibly a 5GID from UE 401 and transfers the non-3GPP slice capability and possibly the 5GID to AMF 413 over N2 signaling. ENTERPRISE-N3IWF SW 923 receives the UE context from AMF 413 over N2 signaling. ENTERPRISE-N3IWF SW 923 establishes user VPN 431 with UE 401 over WIFI AN 402 per the UE context. UE 401 and EDS SW 922 exchange user data over user VPN 431, ENTERPRISE-N3IWF SW 923, and an enterprise data link per the UE context. AMF 413 and UE 401 exchange 3GPP NAS N1 signaling over ENTERPRISE-N3IWF SW 923 and WIFI AN 402. In some examples, ENTERPRISE-N3IWF SW 923 exchanges signaling directly with AUSF-UDM 414, PCF 415, and NSSF 418 without using AMF 413. Thus, ENTERPRISE-N3IWF SW 923 authenticates and authorizes UE 401 over AUSF-UDM 414. ENTERPRISE-N3IWF SW 923 selects a non-3GPP slice instance for UE 401 by using NSSF 418. ENTERPRISE-N3IWF SW 923 retrieves UE context for UE 401 from AUSF-UDM 4 14. ENTERPRISE-N3IWF SW 923 obtains network policy for UE 401 from PCF 415.

Examples that use WIFI-N3IWF 403 as shown on FIG. 6 are now described. EAS SW 921 registers with NEF 419 over AF 420. EAS SW 921 requests a non-3GPP slice for UE 401 from NEF 419 over AF 420. EDS 422 establishes enterprise VPN 432 with WIFI-N3IWF 403. UE 401 and EDS SW 922 exchange user data over user VPN 431, WIFI-N3IWF 403, and enterprise VPN 432 per the UE context and network policy.

Examples that use UE-N3IWF 404 as shown o FIG. 7 are now described. EAS SW 921 registers with NEF 419 over AF 420. EAS SW 921 requests a non-3GPP slice for UE 401 from NEF 419 over AF 420. EDS 422 establishes enterprise VPN 432 with UE-N3IWF 404. UE 401 and EDS SW 922 exchange user data over user UE IWF 404 and enterprise VPN 432 per the UE context and network policy.

Figure 13:
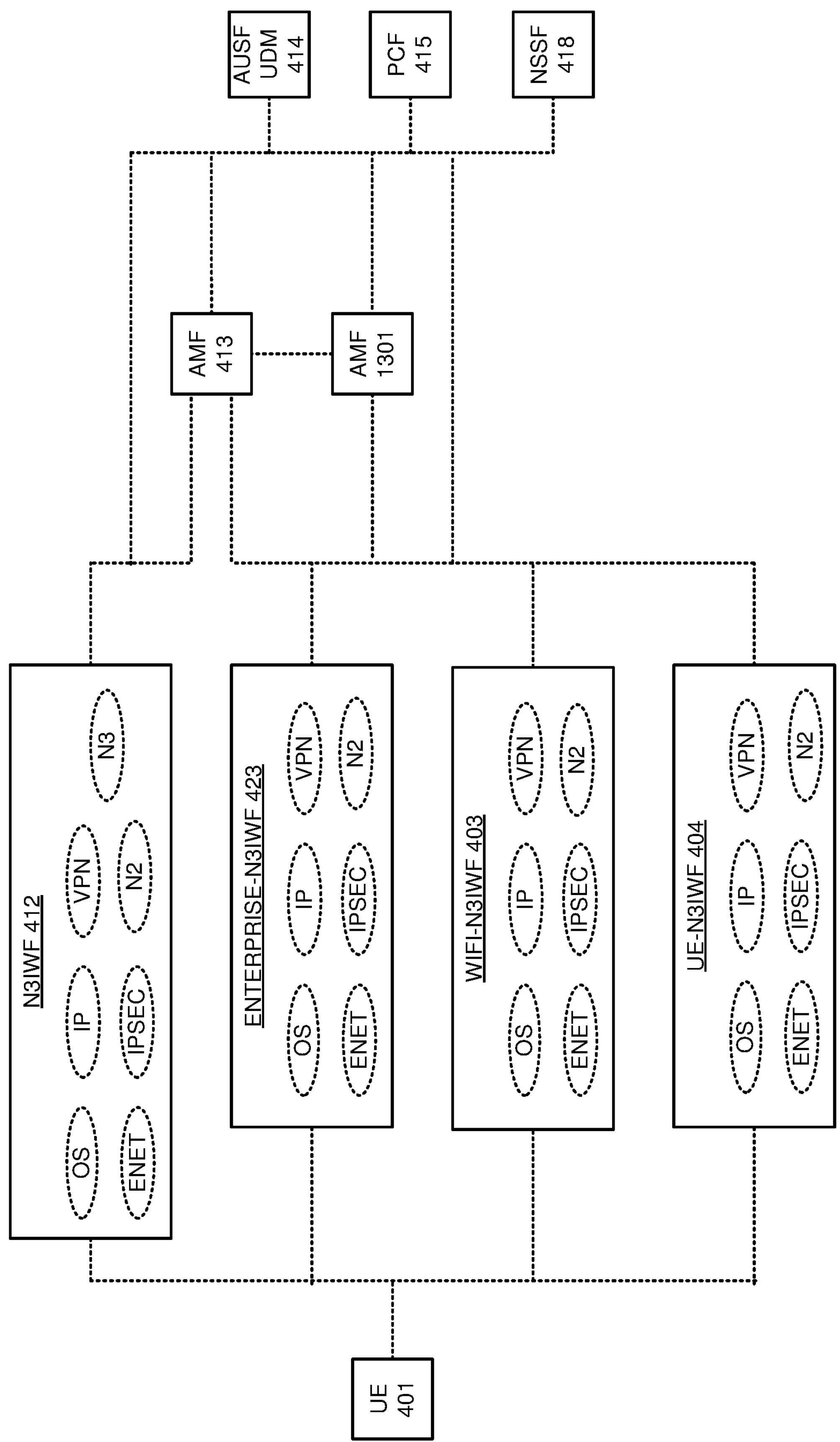
FIG. 13 illustrates exemplary N3IWFs that serve a wireless UE over a non-3GPP network slice.

FIG. 13 illustrates exemplary N3IWFs 403, 404, 412, and 423 that serve wireless UE 401 over a non-3GPP network slice. N3IWFs 403, 404, 412, and 423 may operate on a stand-alone basis or work together by distributing their functions among one another. N3IWF 412 comprises processing circuitry and software. The software in N3IWF 412 comprises an OS and applications for Ethernet, IP, IPsec, VPN, N2, and N3. ENTERPRISE-N3IWF 423 comprises processing circuitry and software. The software in ENTERPRISE-N3IWF 423 comprises an OS and applications for Ethernet, IP, IPsec, VPN, and N2. WIFI-N3IWF 403 comprises processing circuitry and software. The software in WIFI-N3IWF 403 comprises an OS and applications for Ethernet, IP, IPsec, VPN, and N2. UE-N3IWF 404 comprises processing circuitry and software. The software in UE-N3IWF 404 comprises an OS and applications for Ethernet, IP, IPsec, VPN, and N2.

In some examples, N3IWF 412 communicates with AMF 413 over N2 links within the 3GPP core. In other examples, N3IWFs 403-404 and 423 which are external to the 3GPP core communicate with AMF 413 or AMF 1301 over N2 links that traverse IPsec tunnels or some other secure communication links. AMF 1301 is hardened for internet exposure to support the IWFs that are external to the 3GPP core. AMF 413 and AMF 1301 may interact to simultaneously serve UE 401. In some examples, N3IWFs 403-404, 412, and 423 communicate directly with AUSF-UDM 414, PCF 415, and NSSF 418—possibly using IPsec tunnels.

Figure 14:
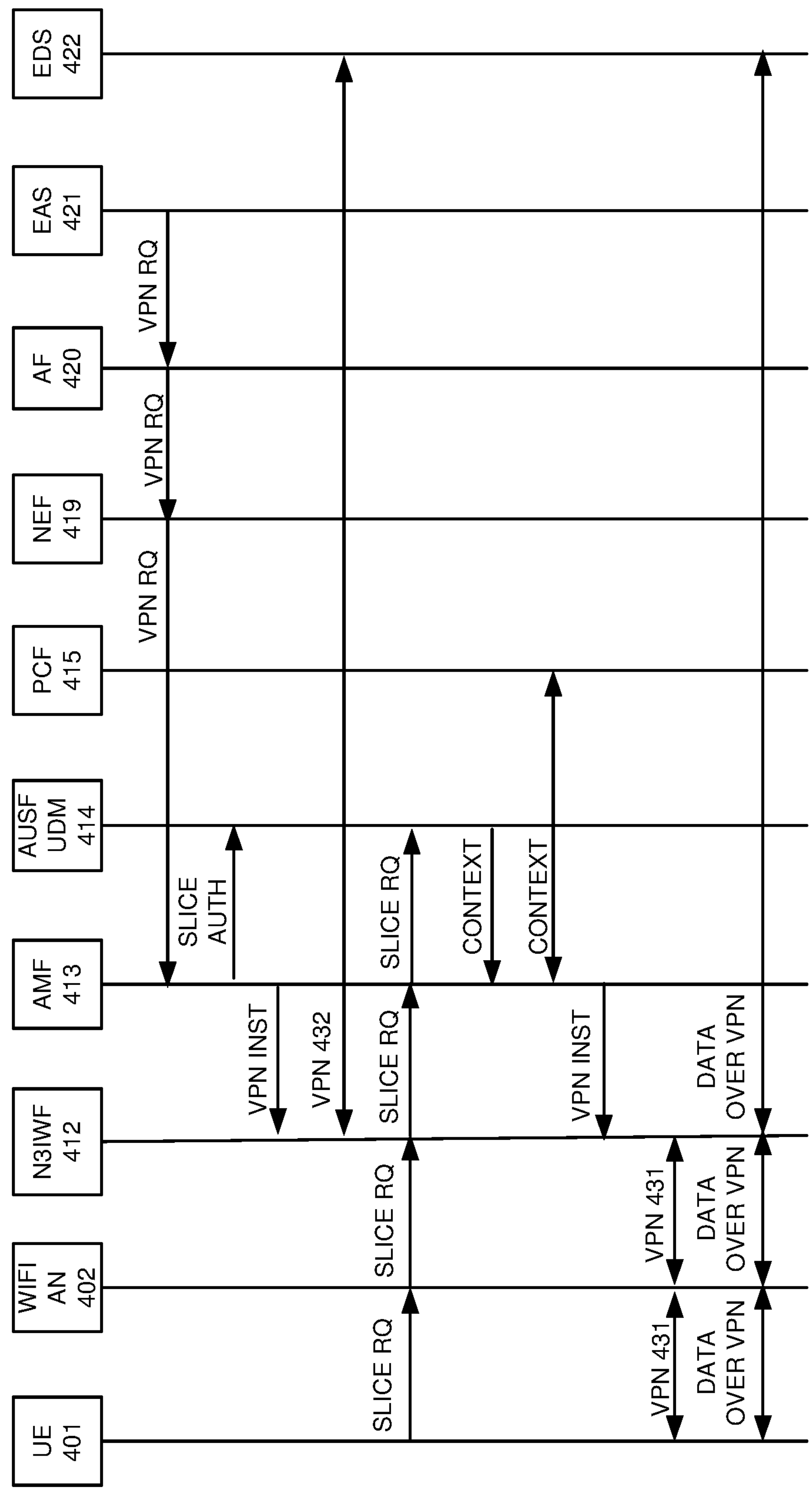
FIG. 14 illustrates an exemplary operation of the wireless communication system that comprises a N3IWF in a 3GPP network to serve a wireless UE over a non-3GPP network slice.

FIG. 14 illustrates an exemplary operation of wireless communication system 400 that comprises N3IWF 412 in 3GPP network 410 to serve wireless UE 401 over a non-3GPP network slice. The operation may vary in other examples. EAS 421 requests enterprise VPN 432 (VPN RQ) from NEF 419 over AF 420. NEF 419 transfers the VPN request to AMF 413. In response to the VPN request, AMF 413 transfers a non-3GPP slice authorization (slice AUTH) for UE 401 to AUSF-UDM 414. In response to the VPN request, AMF 413 transfers a VPN instruction (INST) to N3IWF 412. In response to the VPN instruction, N3IWF 412 establishes enterprise VPN 432 with EDS 422.

UE 401 transfers a slice request (slice RQ) that indicates a non-3GPP slice capability and a 5GID to N3IWF 412 over WIFI AN 402. In this example, the 5GID comprises one or more hardware/software IDs for UE 401. For example, the 5GID may comprise CPU serial number combined with a 3GPP application code. N3IWF 412 transfers the non-3GPP slice request for UE 401 to AMF 413. AMF 413 transfers the non-3GPP slice request for UE 401 to AUSF-UDM 414. AUSF-UDM 414 matches the 5GID with its own copy of the 5GID to authenticate UE 401. AUSF-UDM 414 authorizes UE 401 for the non-3GPP network slice based on the prior slice authorization from AMF 413—which is based on the prior VPN request from EAS 421. AUSF-UDM 414 transfers UE context that includes a slice ID and QoS for UE 401 to AMF 413. AMF 413 retrieves additional UE context that includes network policy for UE 401 from PCF 415. AMF 413 transfers a VPN instruction that includes the UE context for UE 401 to N3IWF 412 in 3GPP N2 signaling. In response to the VPN instruction, N3IWF 412 establishes user VPN 431 with UE 401 over WIFI AN 402. UE 401 and EDS 422 exchange user data over user VPN 431, N3IWF 412, and enterprise VPN 432 per the UE context. AMF 413 and UE 401 exchange 3GPP Non-Access Stratum (NAS) N1 signaling over the N3IWF 412 and WIFI AN 402.

Figure 15:
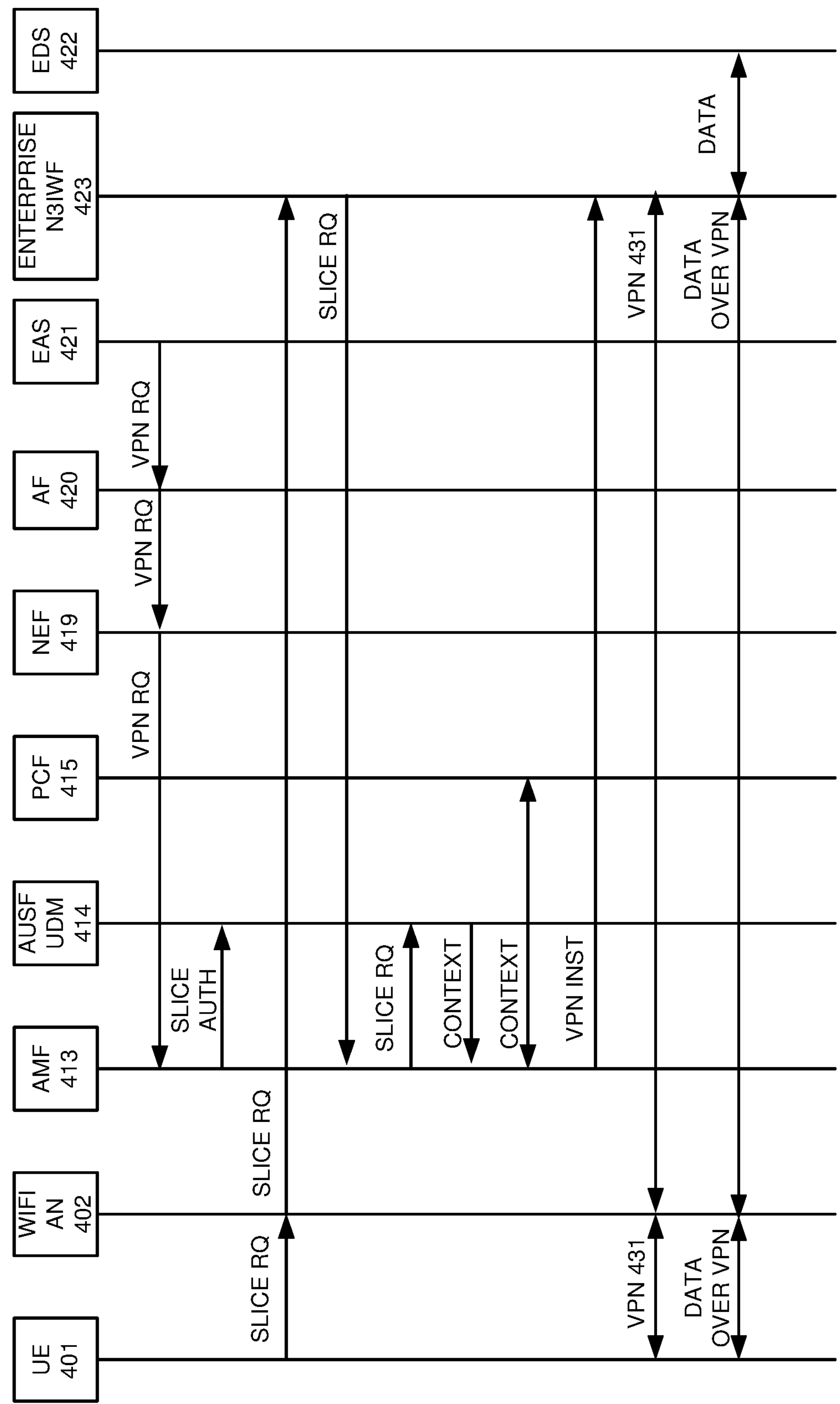
FIG. 15 illustrates an exemplary operation of the wireless communication system that comprises an ENTERPRISE-N3IWF at an enterprise to serve the wireless UE over a non-3GPP network slice.

FIG. 15 illustrates an exemplary operation of wireless communication system 400 that comprises ENTERPRISE-N3IWF 423 to serve wireless UE 401 over a non-3GPP network slice. The operation may vary in other examples. EAS 421 transfers a VPN request for UE 401 to NEF 419 over AF 420. NEF 419 transfers the VPN request for UE 401 to AMF 413. In response to the VPN request, AMF 413 transfers a slice authorization for UE 401 to AUSF-UDM 414.

UE 401 transfers a slice request that indicates a non-3GPP slice capability and a 5GID to ENTERPRISE-N3IWF 423 over WIFI AN 402. In this example, the 5GID comprises one or more hardware/software IDs for UE 401. For example, the 5GID may comprise CPU serial number combined with a 3GPP application code. ENTERPRISE-N3IWF 423 transfers the slice request for UE 401 to AMF 413. AMF 413 transfers the slice request for UE 401 to AUSF-UDM 414. AUSF-UDM 414 matches the 5GID with its own copy of the 5GID to authenticate UE 401. AUSF-UDM 414 authorizes UE 401 for the non-3GPP network slice based on the prior slice authorization from AMF 413 which is based on the VPN request from EAS 421. AUSF-UDM 414 transfers UE context for UE 401 that indicates QoS and slice ID for the non-3GPP network slice to AMF 413. AMF 413 retrieves UE context that indicates network policy for UE 401 from PCF 415. AMF 413 transfers a VPN instruction having the UE context for UE 401 to ENTERPRISE-N3IWF 423 in N2 signaling. In response to the VPN instruction, ENTERPRISE-N3IWF 423 establishes user VPN 431 with UE 401 over WIFI AN 402. UE 401 and EDS 422 exchange user data over user VPN 431, ENTERPRISE-N3IWF 423, and an enterprise data link per the UE context. AMF 413 and UE 401 exchange 3GPP NAS N1 signaling over ENTERPRISE-N3IWF 423 and WIFI AN 402.

Figure 16:
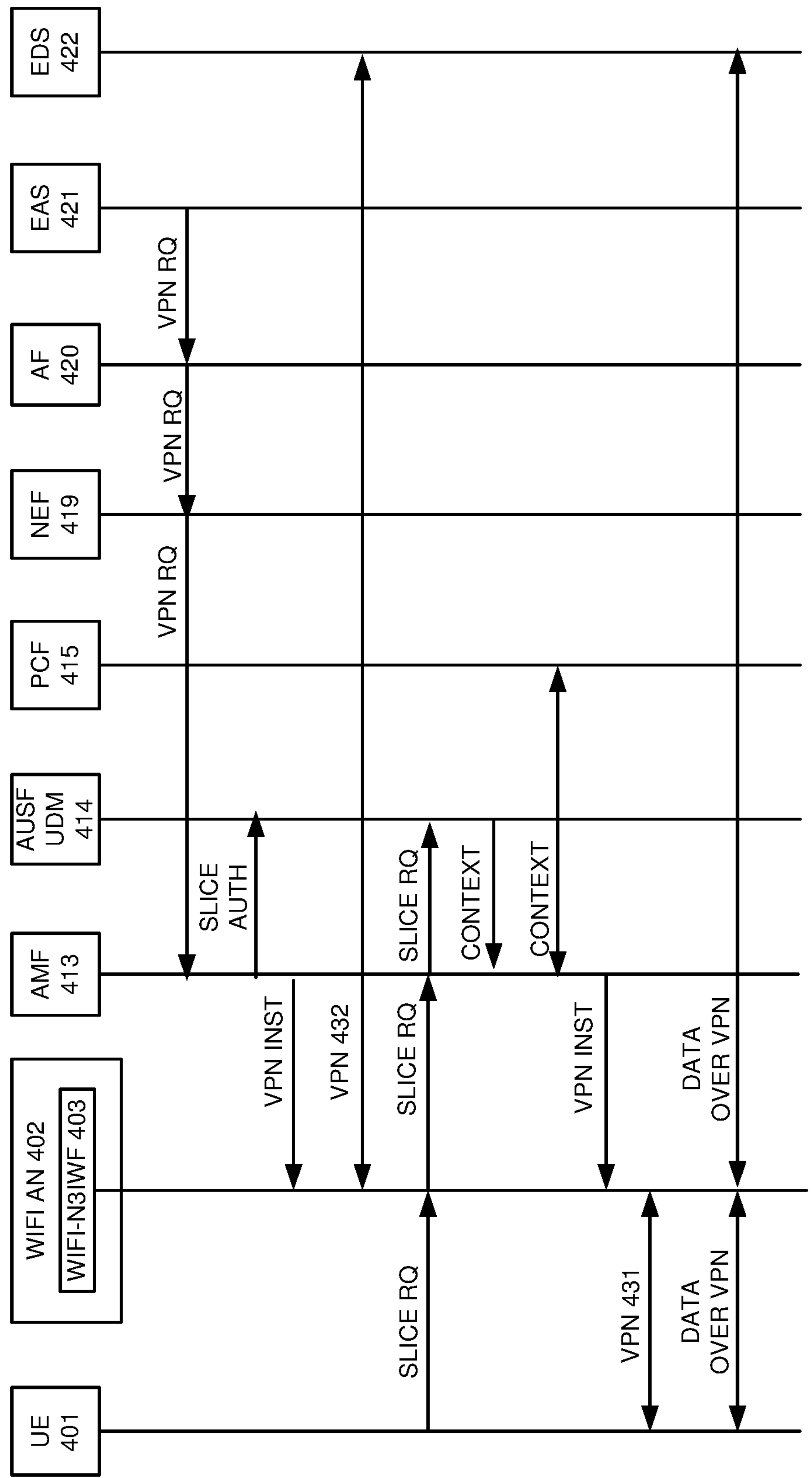
FIG. 16 illustrates an exemplary operation of the wireless communication system that comprises a WIFI N3IWF in a WIFI access node to serve the wireless UE over a non-3GPP network slice.

FIG. 16 illustrates an exemplary operation of the wireless communication system 400 that comprises WIFI-N3IWF 403 in WIFI access node 402 to serve wireless UE 401 over a non-3GPP network slice. The operation may vary in other examples. EAS 421 transfers a VPN request for UE 401 to NEF 419 over AF 420. NEF 419 transfers the VPN request for UE 401 to AMF 413. In response to the VPN request, AMF 413 transfers a slice authorization for UE 401 to AUSF-UDM 414. In response to the VPN request, AMF 413 transfers a VPN instruction for UE 401 to WIFI-N3IWF 403. In response to the VPN instruction, WIFI-N3IWF 403 establishes VPN 432 to EDS 422. UE 401 transfers a slice request indicating a non-3GPP slice capability and a 5GID to WIFI-N3IWF 403. In this example, the 5GID comprises one or more hardware/software IDs for UE 401. For example, the 5GID may comprise CPU serial number combined with a 3GPP application code. WIFI-N3IWF 403 transfers the slice request for UE 401 to AMF 413. AMF 413 transfers the slice request for UE 401 to AUSF-UDM 414. AUSF-UDM 414 matches the 5GID with its own copy of the 5GID to authenticate UE 401. AUSF-UDM 414 authorizes UE 401 for the non-3GPP network slice based on the prior slice authorization from AMF 413 which is based on the VPN request from EAS 421. AUSF-UDM 414 transfers UE context for UE 401 that indicates slice ID and QoS for the non-3GPP network slice to AMF 413. AMF 413 retrieves UE context that indicates network policy for UE 401 from PCF 415. AMF 413 transfers a VPN instruction having the UE context for UE 401 to WIFI-N3IWF 403 in N2 signaling. In response to the VPN instruction, WIFI-IWF 403 establishes user VPN 431 with UE 401 over WIFI AN 402. UE 401 and EDS 422 exchange user data over user VPN 431, WIFI-N3IWF 403, and enterprise VPN 432 per the UE context. AMF 413 and UE 401 exchange 3GPP NAS N1 signaling over WIFI-N3IWF 403 and WIFI AN 402.

Figure 17:
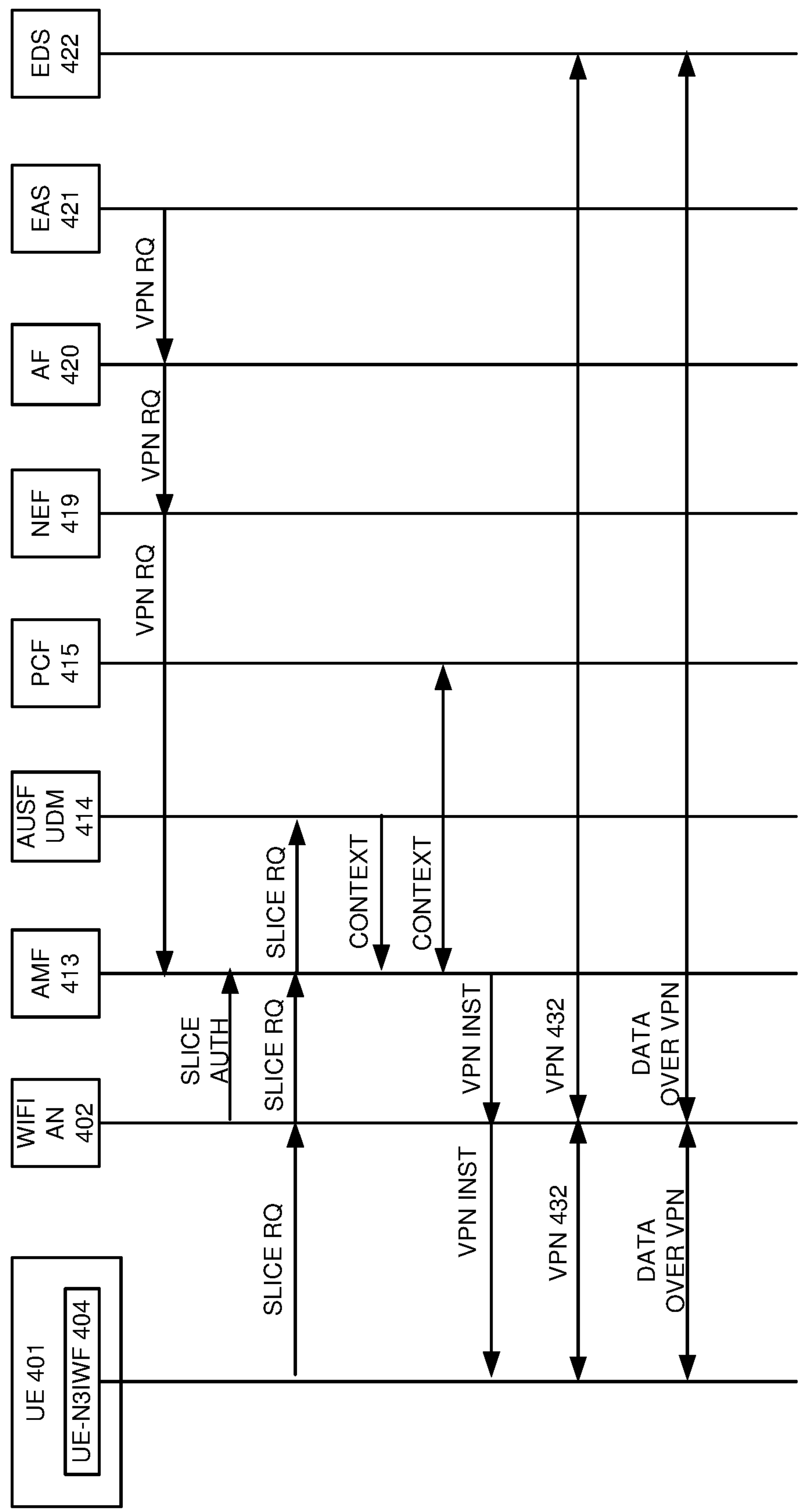
FIG. 17 illustrates an exemplary operation of the wireless communication system that uses a UE-N3IWF in the UE to serve the wireless UE over a non-3GPP network slice.

FIG. 17 illustrates an exemplary operation of wireless communication system 400 that uses UE-N3IWF 404 in UE 401 to serve wireless UE 401 over a non-3GPP network slice. The operation may vary in other examples. EAS 421 transfers a VPN request for UE 401 to NEF 419 over AF 420. NEF 419 transfers the VPN request for UE 401 to AMF 413. In response to the VPN request, AMF 413 transfers a slice authorization for UE 401 to AUSF-UDM 414.

UE 401 transfers a slice request that indicates a non-3GPP slice capability and a 5GID to UE-N3IWF 404. In this example, the 5GID comprises one or more hardware/software IDs for UE 401. For example, the 5GID may comprise CPU serial number combined with a 3GPP application code. UE-N3IWF 404 transfers the slice request for UE 401 to AMF 413 over N2 signaling. AMF 413 transfers the slice request for UE 401 to AUSF-UDM 414. AUSF-UDM 414 matches the 5GID with its own copy of the 5GID to authenticate UE 401. AUSF-UDM 414 authorizes UE 401 for the non-3GPP network slice based on the slice authorization from AMF 413 that is based on the VPN request from EAS 421. AUSF-UDM 414 transfers UE context for UE 401 that indicates slice ID and QoS for the non-3GPP network slice to AMF 413. AMF 413 retrieves UE context that indicates network policy for the non-3GPP network slice for UE 401 from PCF 415. AMF 413 transfers a VPN instruction having the UE context for UE 401 to UE-N3IWF 404 in N2 signaling. UE-N3IWF 404 establishes enterprise VPN 432 with EDS 422 over WIFI AN 402 in response to the VPN instruction. UE 401 and EDS 422 exchange user data over user UE-N3IWF 404 and enterprise VPN 432 per the UE context. AMF 413 and UE 401 exchange 3GPP NAS N1 signaling over UE-N3IWF 404 and WIFI AN 402.

The wireless communication system circuitry described above comprises computer hardware and software that form special-purpose data communication circuitry to serve a wireless communication device over a non-3GPP network slice. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to serve a wireless communication device over a non-3GPP network slice.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to serve a wireless communication device over a Non Third Generation Partnership Project (non-3GPP) network slice, the method comprising:
receiving a request for the non-3GPP network slice from the wireless communication device over a non-3GPP access node;
in response to the request, exchanging network signaling with a 3GPP network and receiving an authorization from the 3GPP network for the wireless communication device to use the non-3GPP network slice;
establishing a Virtual Private Network (VPN) for the wireless communication device over the non-3GPP access node in response to the authorization from the 3GPP network;
exchanging user data with the wireless communication device over the VPN; and
exchanging the user data with a non-3GPP data communication system over one of the VPN and another VPN for the non-3GPP data communication system.

2. The method of claim 1 further comprising:
exchanging 3GPP Non-Access Stratum (NAS) N1 signaling with the wireless communication device over the non-3GPP access node; and
exchanging the 3GPP NAS N1 signaling with the 3GPP network.

3. The method of claim 1 wherein:
receiving the request for the non-3GPP network slice from the wireless communication device comprises receiving authentication information from the wireless communication device;
exchanging the network signaling with the 3GPP network comprises transferring the authentication information from the wireless communication device to the 3GPP network; and
receiving the authorization from the 3GPP network for the wireless communication device comprises receiving the authorization in response to the 3GPP network authenticating the wireless communication device based on the authentication information.

4. The method of claim 1 further comprising:
receiving a Quality-of-Service (QoS) level for the wireless communication device from the 3GPP network in response to the exchange of the network signaling with the 3GPP network; and wherein
exchanging the user data with the wireless communication device and with the non-3GPP communication system comprises using the QoS level.

5. The method of claim 1 further comprising:
receiving a network policy for the wireless communication device from the 3GPP network in response to the exchange of the network signaling with the 3GPP network; and wherein
exchanging the user data with the wireless communication device and the non-3GPP communication system comprises using the network policy.

6. The method of claim 1 wherein exchanging the network signaling with the 3GPP network comprises exchanging the network signaling with an Access and Mobility Management Function (AMF).

7. The method of claim 1 wherein exchanging the network signaling with the 3GPP network comprises exchanging 3GPP N2 signaling.

8. One or more non-transitory machine-readable media comprising instructions to direct one or more microprocessors to operate a Non Third Generation Partnership Project Interworking Function (N3IWF) to serve a wireless communication device over a Non Third Generation Partnership Project (non-3GPP) network slice by performing a method comprising:
establishing an enterprise VPN with an enterprise in response to an instruction from the 3GPP network;
receiving a request for the non-3GPP network slice from a wireless communication device over a non-3GPP access node;
in response to the request, exchanging network signaling with a 3GPP network and receiving an authorization from the 3GPP network for the wireless communication device to use the non-3GPP network slice;
establishing a user VPN with the wireless communication device over the non-3GPP access node in response to the authorization from the 3GPP network;
exchanging user data with the wireless communication device over the user VPN; and
exchanging the user data with the enterprise over the enterprise VPN.

9. The one or more non-transitory machine-readable media of claim 8 wherein the method comprises:
exchanging 3GPP Non-Access Stratum (NAS) N1 signaling with the wireless communication device over the non-3GPP access node; and
exchanging the 3GPP NAS N1 signaling with the 3GPP network.

10. The one or more non-transitory machine-readable media of claim 8 wherein:
receiving the request for the non-3GPP network slice from the wireless communication device comprises receiving authentication information from the wireless communication device;
exchanging the network signaling with the 3GPP network comprises transferring the authentication information from the wireless communication device to the 3GPP network; and
receiving the authorization for the wireless communication device from the 3GPP network comprises receiving the authorization in response to the 3GPP network authenticating the wireless communication device based on the authentication information.

11. The one or more non-transitory machine-readable media of claim 8 wherein the method comprises:
receiving a Quality-of-Service (QoS) level for the wireless communication device from the 3GPP network in response to the exchange of the network signaling with the 3GPP network; and wherein
exchanging the user data with the wireless communication device over the user VPN comprises using the QoS level; and
exchanging the user data with the enterprise over the enterprise VPN comprises using the QoS level.

12. The one or more non-transitory machine-readable media of claim 8 wherein the method comprises:
exchanging the user data with the wireless communication device comprises receiving a network policy for the wireless communication device from the 3GPP network in response to the exchange of the network signaling with the 3GPP network; and wherein exchanging the user data with the wireless communication device over the user VPN comprises using the network policy; and exchanging the user data with the enterprise over the enterprise VPN comprises using the network policy.

13. The one or more non-transitory machine-readable media of claim 8 wherein exchanging the network signaling with the 3GPP network comprises exchanging the network signaling with an Access and Mobility Management Function (AMF).

14. The one or more non-transitory machine-readable media of claim 8 wherein exchanging the network signaling with the 3GPP network comprises exchanging 3GPP N2 signaling.

15. A Non-Third Generation Partnership Project Interworking Function (N3IWF) to serve a wireless communication device over a Non Third Generation Partnership Project (non-3GPP) network slice, the N3IWF comprising:

an N3IWF VPN interface to establish an enterprise Virtual Private Network (VPN) with an enterprise;

an N3IWF N2 interface to exchange network signaling with a 3GPP network and receive an authorization from the 3GPP network for the wireless communication device to use the non-3GPP network slice;

the N3IWF VPN interface to establish a user VPN with the wireless communication device over a non-3GPP access node in response to the authorization from the 3GPP network;

the N3IWF VPN interface to exchange user data with the wireless communication device over the user VPN; and the N3IWF VPN interface to exchange the user data with the enterprise over the enterprise VPN.

16. The N3IWF of claim 15 further comprising:

an N3IWF N1 interface to exchange 3GPP Non-Access Stratum (NAS) N1 signaling with the wireless communication device over a non-3GPP access node; and the N3IWF N1 interface to exchange the 3GPP NAS N1 signaling with the 3GPP network.

17. The N3IWF of claim 15 wherein:

the N3IWF N2 interface is to transfer authentication information for the wireless communication device to the 3GPP network in the exchange of the network signaling with the 3GPP network; and the N3IWF N2 interface is to receive the authorization for the wireless communication device in response to the 3GPP network authenticating the wireless communication device based on the authentication information in the authorization from the 3GPP network.

18. The N3IWF of claim 15 further comprising:

the N3IWF N2 interface to receive a Quality-of-Service (QoS) level for the wireless communication device from the 3GPP network in response to the exchange of the network signaling with the 3GPP network; and wherein the N3IWF VPN interface is to use the QoS level to exchange the user data with the wireless communication device over the user VPN; and the N3IWF VPN interface is to use the QoS level to exchange the user data with the enterprise over the enterprise VPN.

19. The N3IWF of claim 15 further comprising:

the N3IWF N2 interface to receive a network policy for the wireless communication device from the 3GPP network in response to the exchange of the network signaling with the 3GPP network; and wherein the N3IWF VPN interface is to use the network policy to exchange the user data with the wireless communication device over the user VPN; and the N3IWF VPN interface is to use the network policy to exchange the user data with the enterprise over the enterprise VPN.

20. The N3IWF of claim 15 wherein the N3IWF is integrated within a non-3GPP wireless access node.

* * * * *